United States Patent [19]

Wunderlich et al.

[11] Patent Number: 4,474,697

[45] Date of Patent: Oct. 2, 1984

[54] FLUOROTRIAZINE-GROUP-CONTAINING AZO DYESTUFFS

[75] Inventors: Klaus Wunderlich; Wolfgang Harms, both of Leverkusen, Fed. Rep. of Germany

[73] Assignee: Bayer Aktiengesellschaft, Leverkusen, Fed. Rep. of Germany

[21] Appl. No.: 480,775

[22] Filed: Apr. 1, 1983

Related U.S. Application Data

[63] Continuation of Ser. No. 919,450, Jun. 27, 1978, abandoned.

[30] Foreign Application Priority Data

Jun. 29, 1977 [DE] Fed. Rep. of Germany ....... 2729240
Jul. 13, 1977 [DE] Fed. Rep. of Germany ....... 2731617

[51] Int. Cl.³ .............................................. C09B 17/04
[52] U.S. Cl. .................................................... 260/153
[58] Field of Search ............................ 260/153, 146 T

[56] References Cited

U.S. PATENT DOCUMENTS 4,066,389  1/1978  Riat et al. ................... 260/153 X
4,115,378  9/1978  Bien et al. ................... 260/153 X

OTHER PUBLICATIONS

Chemical Abstracts: 92 197745z (1980).
Chemical Abstracts 90 205774k (1979).
Chemical Abstracts 90 12308r (1979).

*Primary Examiner*—Helen M. S. Sneed
*Attorney, Agent, or Firm*—Sprung, Horn, Kramer & Woods

[57] ABSTRACT

Reactive dyestuffs of the formula

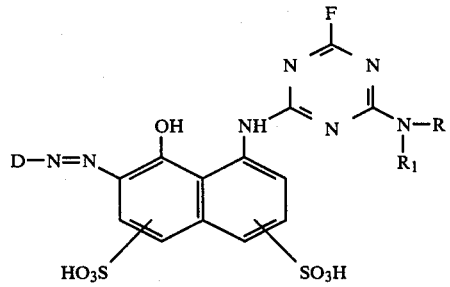

wherein R, D, $R_1$, $R_2$ and n have the meaning indicated in the description, and their use for dyeing textile materials containing hydroxyl groups and textile materials containing nitrogen, in particular for textile materials made of natural and regenerated cellulose, in red shades.

6 Claims, No Drawings

FLUOROTRIAZINE-GROUP-CONTAINING AZO DYESTUFFS

The present invention relates to reactive dyestuffs of the formula

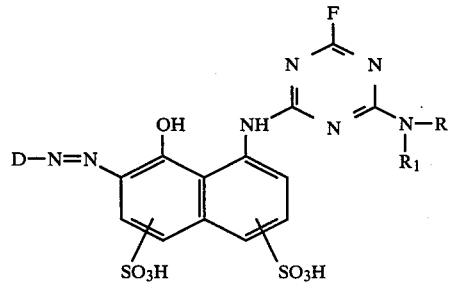
(I)

wherein
R is

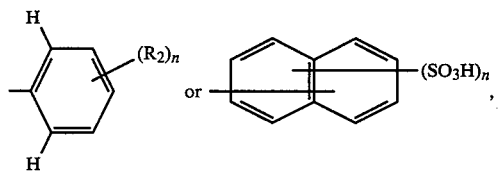

D is the radical of a diazo component,
$R_1$ is H or alkyl,
$R_2$ is $SO_3H$, $SO_2NHR_1$, $SO_2NR_1R_3$, $COOR_1$, $CONHR_1$, $CONR_1R_3$, CN, OH, halogen, alkyl, alkoxy, alkylcarbonylamino or ureido,
wherein
$R_3$ is alkyl, and
n= is 1, 2 or 3.

The alkyl and alkoxy radicals and the ureido radicals can be optionally substituted. Preferred alkyl and alkoxy radicals are those with 1-4 C atoms. Preferred radicals $R_1$ are hydrogen as well as $CH_3$ and $C_2H_5$. Examples of the radicals $R_2$ are fluorine, chlorine and bromine, and furthermore the groups: $SO_3H$, $SO_2NH_2$, $SO_2NHCH_3$, $SO_2N(CH_3)_2$, $SO_2NHC_2H_5$, $SO_2N$-$H$—$CH_2$—$CH_2OH$, $SO_2N(CH_3)CH_2$—$CH_2OH$, $SO_2$—$NH$—$CH_2$—$CH_2$—$OSO_3H$, COOH, $COOCH_3$, $COOC_2H_5$, $CONH_2$, $CONHCH_3$, $CON(CH_3)_2$, $CONHC_2H_5$, CN, $CH_3$, $C_2H_5$, $C_3H_7$, $C_4H_9$, $CH_2$—$SO_3H$, $CH_2OH$, $CH_2$—COOH, $OCH_3$, $OC_2H_5$, $O$—$C_2H_4$—OH, $O$—$CH_2$—$CH_2$—$OCH_3$, $O$—$CH_2$—$CH_2$—$OC_2H_5$, NH—$COCH_3$, NH—CO—$CH_2OH$, NH—CO—$CH_2Cl$, NH—CO—$CH_2$—$SO_3H$, NH—CO—$NH_2$, NH—CO—NH—$CH_2$—$CH_2OH$, NH—CO—$NHCH_3$ and NH—$CON(CH_3)_2$.

Preferred radicals $R_3$ are $CH_3$, $C_2H_5$ and $C_2H_4OH$.

Preferred dyestuffs within the scope of the formula (I) are those of the formula

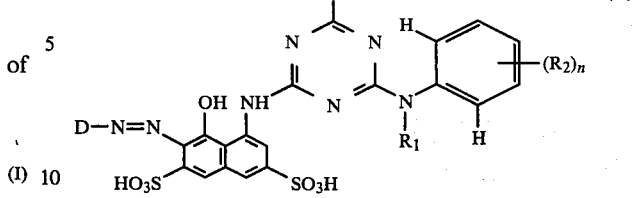
(II)

as well as those of the formula

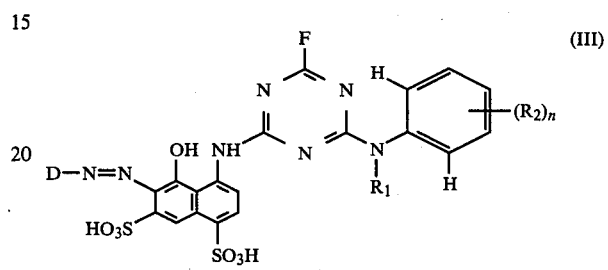
(III)

and furthermore those of the formula

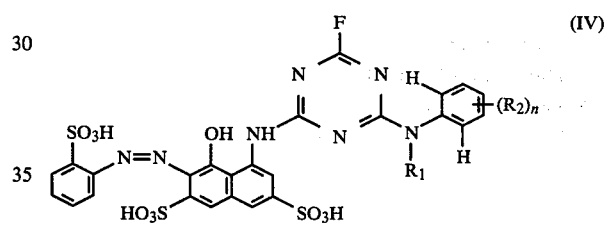
(IV)

and those of the formula

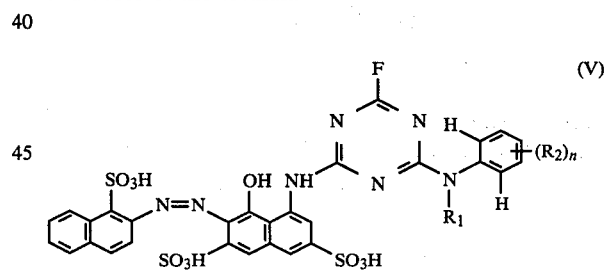
(V)

and finally those of the formula

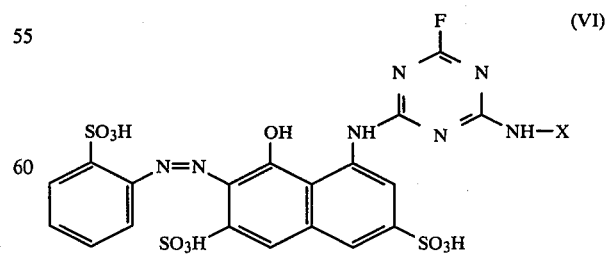
(VI)

wherein
X is 3-sulphophenyl, 4-methylphenyl or 3-hydroxyphenyl, and those of the formula

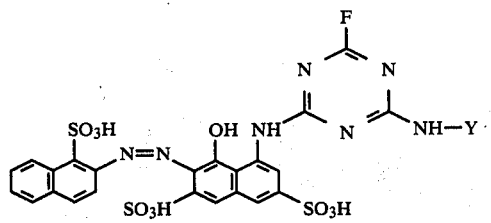
(VII)

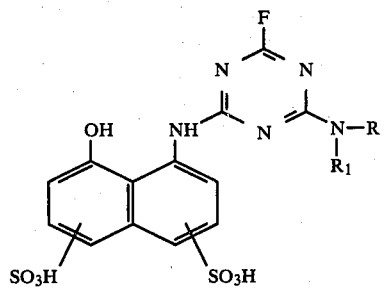
(XI)

wherein Y is 4-sulphophenyl, 4-acetylaminophenyl or 3-hydroxyphenyl.

Dyestuffs of the formulae (II)–(V) with the substituent

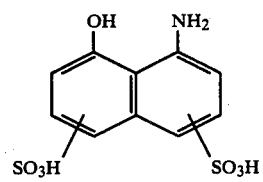

on the group

are also preferred.

The dyestuffs of the formula (I) are obtained by a process in which 1-amino-8-hydroxynaphthalene-disulphonic acids of the formula

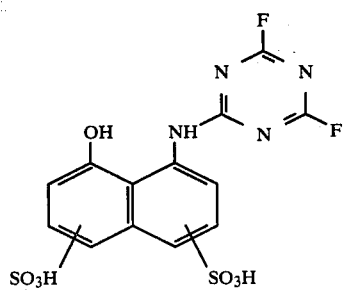
(VIII)

are first subjected to a condensation reaction with cyanuric fluoride to give compounds of the formula (IX)

and these are then subjected to a condensation reaction with aromatic amines of the formula

(X)

wherein R and R₁ have the meaning indicated above, to give compounds of the formula wherein R and R₁ have the meaning indicated, and the reactive intermediate products of the formula (XI) are then coupled with diazotised amines of the general formula

D—NH$_2$  (XII)

One variant of the preparation of compounds of the formula (XI) consists in reacting cyanuric fluoride with the aromatic amines of the formula (X) to give reactive components of the formula

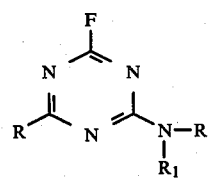
(XIII)

and subjecting these to a condensation reaction with the aminohydroxynaphthalenedisulphonic acids of the formula (VIII).

Further variants of the preparation of dyestuffs of the formula (I) consist in first coupling the intermediate products (IX) with diazonium salts to give difluorotriazinyl-azo dyestuffs of the formula

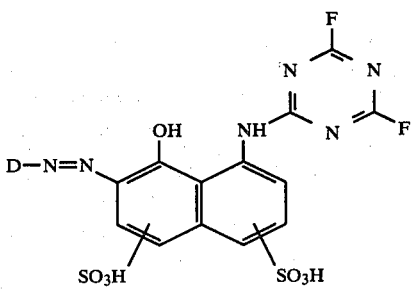
(XIV)

and then subjecting these compounds (XIV) to a condensation reaction with the amines (X), or subjecting azo dyestuffs of the formula

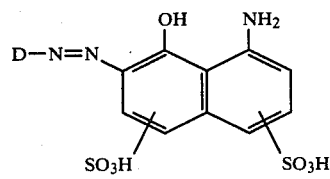
(XV)

to a condensation reaction either with the reactive components of the formula (XIII), or stepwise with cyanuric fluoride to give the compounds (XIV) and then subjecting these compounds to a condensation reaction with the aromatic amines (X) to give the dyestuffs (I).

Examples of compounds of the formula (VIII) are: 1-amino-8-hydroxy-naphthalene-3,6-disulphonic acid, 1-amino-8-hydroxy-naphthalene-4,6-disulphonic acid, 1-amino-8-hydroxynaphthalene-3,5-disulphonic acid and 1-amino-8-hydroxy-naphthalene-2,4-disulphonic acid.

Examples of aromatic amines of the formula (X) which are suitable for the condensation reaction with the intermediate products (IX) or (XIV) are: 1-amino-3- or -4-methylbenzene, 1-amino-3,4- or -3,5-dimethylbenzene, 1-amino-3- or -4-ethylbenzene, 1-amino-3- or -4-methoxybenzene, 1-amino-4-ethoxybenzene, 1-amino-3- or -4-(2-hydroxyethoxy)-benzene, 1-amino-3- or -4-(2-methoxyethoxy)-benzene, 1-amino-3- or -4-chlorobenzene, 3- or 4-amino-phenylmethanesulphonic acid, 3-aminobenzenesulphonic acid, 4-aminobenzenesulphonic acid, 5-aminobenzene-1,3-disulphonic acid, 4-aminobenzene-1,2-disulphonic acid, 4-amino-5-methylbenzene-1,2-disulphonic acid, 3- or 4-aminobenzenesulphonamide, 3- or 4-aminobenzenesulphonic acid methylamide, 3- or 4-aminobenzenesulphonic acid dimethylamide, 3- or 4-aminobenzenesulphonic acid (2-hydroxyethyl)amide, 5-aminobenzene-1,3-dicarboxylic acid, 3- or 4-aminobenzoic acid, 3- or 4-aminobenzamide, 3- or 4-aminobenzoic acid methyl ester or ethyl ester, 3- or 4-aminobenzonitrile, 3-amino-(N-phenylsulphonyl)-benzenesulphonamide, 3- or 4-aminophenol, 5-amino-2-hydroxybenzenesulphonic acid, 4-amino-2-hydroxybenzenesulphonic acid, 5-amino-2-ethoxybenzenesulphonic acid, 1-acetylamino-3- or -4-aminobenzene, 1-amino-3- or -4-(hydroxyacetyl)-aminobenzene, 1-amino-4-(sulphoacetyl)aminobenzene, 3- or 4-aminophenylurea, N-(3-aminophenyl)-N'-(2-hydroxyethyl)-urea, 3- or 4-aminophenyloxamic acid, 1-methylamino-3- or -4-methylbenzene, 1-ethylamino-4-chlorobenzene, 1-ethylamino-3- or -4-methylbenzene, -(2-hydroxyethyl)-amino-3-methylbenzene, 3- or 4-methylaminobenzoic acid and 4-methylaminobenzenesulphonic acid.

2-Aminonaphthalene-1-sulphonic acid, 4-aminonaphthalene-1-sulphonic acid, 5-aminonaphthalene-1-sulphonic acid, 6-aminonaphthalene-1-sulphonic acid, 7-aminonaphthalene-1-sulphonic acid, 8-aminonaphthalene-1-sulphonic acid, 1-aminonaphthalene-2-sulphonic acid, 4-aminonaphthalene-2-sulphonic acid, 5-aminonaphthalene-2-sulphonic acid, 6-aminonaphthalene-2-sulphonic acid, 7-aminonaphthalene-2-sulphonic acid, 7-methylaminonaphthalene-2-sulphonic acid, 7-ethylaminonaphthalene-2-sulphonic acid, 7-butylaminonaphthalene-2-sulphonic acid, 7-isobutylaminonaphthalene-2-sulphonic acid, 8-aminonaphthalene-2-sulphonic acid, 4-aminonaphthalene-1,3-disulphonic acid, 5-aminonaphthalene-1,3-disulphonic acid, 6-aminonaphthalene-1,3-disulphonic acid, 7-aminonaphthalene-1,3-disulphonic acid, 8-aminonaphthalene-1,3-disulphonic acid, 2-aminonaphthalene-1,5-disulphonic acid, 3-aminonaphthalene-1,5-disulphonic acid, 4-aminonaphthalene-1,5-disulphonic acid, 4-aminonaphthalene-1,6-disulphonic acid, 8-aminonaphthalene-1,6-disulphonic acid, 4-aminonaphthalene-1,7-disulphonic acid, 3-aminonaphthalene-2,6-disulphonic acid, 4-aminonaphthalene-2,6-disulphonic acid, 3-aminonaphthalene-2,7-disulphonic acid, 4-aminonaphthalene-2,7-disulphonic acid, 6-aminonaphthalene-1,3,5-trisulphonic acid, 7-aminonaphthalene-1,3,5-trisulphonic acid, 8-aminonaphthalene-1,3,5-trisulphonic acid, 4-aminonaphthalene-1,3,6-trisulphonic acid, 7-aminonaphthalene-1,3,6-trisulphonic acid, 8-aminonaphthalene-1,3,6-trisulphonic acid and 4-aminonaphthalene-1,3,7-trisulphonic acid.

Examples of diazotisable amines of the formula (XII) which may be mentioned are: 2-aminobenzenesulphonic acid, 3-aminobenzenesulphonic acid, 4-aminobenzenesulphonic acid, 2-aminobenzene-1,4-disulphonic acid, 4-aminobenzene-1,3-disulphonic acid, 6-amino-5-methylbenzene-1,3-disulphonic acid, 2-amino-5-methylbenzenesulphonic acid, 2-amino-5-methoxybenzenesulphonic acid, 2-amino-4-chlorobenzenesulphonic acid, 2-amino-5-chlorobenzenesulphonic acid, 2-amino-5-acetylaminobenzenesulphonic acid, 2-amino-4-acetylaminobenzenesulphonic acid, 3-amino-4-methoxybenzenesulphonic acid, 3-amino-4-methylbenzenesulphonic acid, 2-amino-3,5-dimethylbenzenesulphonic acid, 4-amino-5-methylbenzene-1,2-disulphonic acid, 2-amino-4-sulphobenzoic acid, 2-amino-5-sulphobenzoic acid, 2-aminobenzoic acid, 4-aminobenzoic acid, 1-amino-2-, -3- or -4-methylbenzene, 1-aminobenzene, 1-amino-2-, -3- or -4-methoxybenzene, 1-amino-2-trifluoromethylbenzene, 2-aminonaphthalene-1-sulphonic acid, 2-amino-naphthalene-1,5-disulphonic acid, 2-amino-naphthalene-1,7-disulphonic acid, 3-aminonaphthalene-1,5-disulphonic acid, 3-amino-naphthalene-2,6-disulphonic acid, 2-amino-naphthalene-3,6-disulphonic acid, 7-amino-naphthalene-1,3-disulphonic acid, 6-amino-naphthalene-1,3-disulphonic acid, 4-amino-naphthalene-1-sulphonic acid, 5-amino-naphthalene-1-sulphonic acid, 6-amino-naphthalene-1-sulphonic acid, 1-amino-naphthalene-3,7-disulphonic acid, 4-amino-naphthalene-1,3-disulphonic acid, 6-amino-naphthalene-1,3,5-trisulphonic acid, 7-amino-naphthalene-1,3,6-trisulphonic acid, 4-amino-naphthalene-1,3,6-trisulphonic acid, 4-aminophenyl-methanesulphonic acid, 1-amino-3- or -4-(sulphoacetyl)-aminobenzene and 1-amino-2-chlorobenzene.

The reaction of the compounds (VIII) or (XV) with cyanuric flouride is carried out in an aqueous medium at temperatures from $-10°$ to $+10°$, preferably 0° to $+5°$, in the presence of alkaline condensing agents, such as alkali metal hydroxide solutions, alkali metal carbonate solutions, alkali metal bicarbonate solutions, alkali metal phosphate solutions or alkali metal hydrogen phosphate solutions, at pH values of 2–7, but preferably 3–5.

The further condensation of the compounds (IX) or (XIV) with the amines of the formula (X) is carried out in an aqueous medium at temperatures from $-10°$ to $+40°$, preferably in the range from 0° to $+20°$, and at pH values of 4–8. The condensation of the compounds (VIII) or (XV) with the reactants (XIII) can also be carried out under these conditions in an aqueous or aqueous-organic medium.

A particularly advantageous and economical process variant consists in carrying out all the process steps successively, without isolating the intermediate stages.

The new dyestuffs are extremely valuable products which are suitable for the most diverse application purposes. They are of preferred interest for dyeing textile materials containing hydroxyl groups and textile materials containing nitrogen, in particular for textile materials made of natural and regenerated cellulose, in red shades. Because of the reactive fluorine substituent in the triazine ring, the products are exceptionally suitable for use as reactive dyestuffs for dyeing cellulose materials in accordance with the dyeing techniques which have been disclosed for these materials, and especially for dyeing these materials from a long liquor by the exhaustion process.

The formulae given are those of the free acids. In general, their salts are employed for dyeing, in particular the alkali metal salts (for example Na salts, K salts and Li salts) or also the ammonium salts. The dyestuffs are also generally isolated in the form of the salts.

The temperature data are in °C.

EXAMPLE 1

127.6 g of 1-amino-8-hydroxynaphthalene-3,6-disulphonic acid are dissolved in 1,600 ml of water at pH 5.5. After cooling the solution to 0°–5°, 34.2 ml of cyanuric fluoride are added dropwise in the course of 30 minutes and the pH value of the solution is kept at 4.0–4.5 by means of 20% strength sodium carbonate solution. When the reaction has ended, a neutralised solution of 69.5 g of 4-aminobenzenesulphonic acid in 300 ml of water is added dropwise and the pH value is kept at 4.8–5.0, whilst keeping the mixture at 0°–5°. The mixture is further stirred under these conditions for about 1 hour, until the condensation reaction has ended and no more sodium carbonate solution is consumed.

89.2 g of 2-aminonaphthalene-1-sulphonic acid are dissolved in 1,000 ml of water at pH 7. The solution is cooled to 0°–5°, 80 ml of concentrated hydrochloric acid are added and 100 ml of 4N sodium nitrite solution are added dropwise. The mixture is subsequently stirred at 0°–5° for half and hour and any excess of nitrite still present is destroyed with amidosulphonic acid solution.

The diazonium salt solution is slowly added to the solution of the reactive component prepared above and coupling is carried out at pH 7.5–8.0 and at 0°–10°. The temperature is allowed to rise to 20°, the pH value is adjusted to 5.0 with 10% strength hydrochloric acid and the dyestuff is salted out with 400 g of sodium chloride. It is filtered off, washed with 20% strength sodium chloride solution and dried at 40° in vacuo.

In the form of the free acid, the dyestuff corresponds to the formula g of sodium carbonate and treating the material at this temperature for 60 minutes.

After rinsing, soaping at the boil and drying, a bluish-tinged red dyeing which has good fastness to light and is very fast to wet processing is obtained.

EXAMPLE 2

63.8 g of 1-amino-8-hydroxynaphthalene-3,6-disulphonic acid are dissolved in 800 ml of water at pH 5.5 and the solution is cooled to 0°–5°. 18.2 ml of cyanuric fluoride are added dropwise in the course of 15 minutes, and during this the pH value in the solution is kept at 4.0–4.5 with sodium carbonate solution. The mixture is subsequently stirred under the same conditions for ½ hour and a solution which has been prepared by dissolving 34.6 g of 3-aminobenzenesulphonic acid in 150 ml of water at pH 6.0 is then added dropwise. The pH value is adjusted to 5.5 and the temperature is further kept at 0°–5°. The condensation reaction has ended after about 1 hour.

38.1 g of 2-aminobenzenesulphonic acid are dissolved in 400 ml of water at pH 6.5. After adding 40 ml of concentrated hydrochloric acid and cooling the mixture to 0°–5°, the amine is diazotised by adding 55 ml of 4N sodium nitrite solution dropwise. When the diazotisation has ended, after 178 –1 hour, excess nitrite is removed with amidosulphonic acid solution.

The diazo compound thus obtained is now added dropwise, at 0°–10°, to the coupling component obtained above and the pH value is kept at 7.0–7.5 with sodium carbonate solution. When the coupling has ended, the temperature is allowed to rise to 20°, the pH value is adjusted to 6.0 with 10% strength hydrochloric acid and the dyestuff, which precipitates in the form of small needles, is salted out with 200 g of sodium chloride. The precipitate is subsequently stirred for 1 hour and filtered off and the dyestuff cake is washed with 700 ml of 15% strength sodium chloride solution.

After drying the cake at 40° in vacuo, the dyestuff of the formula

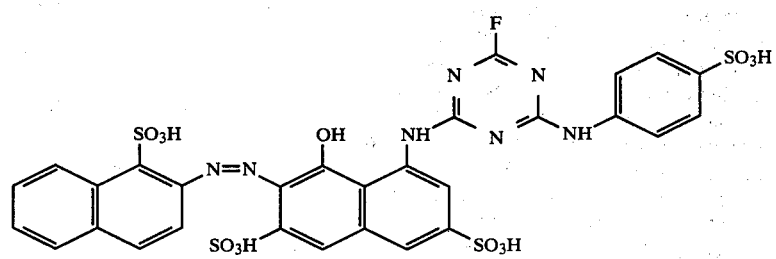

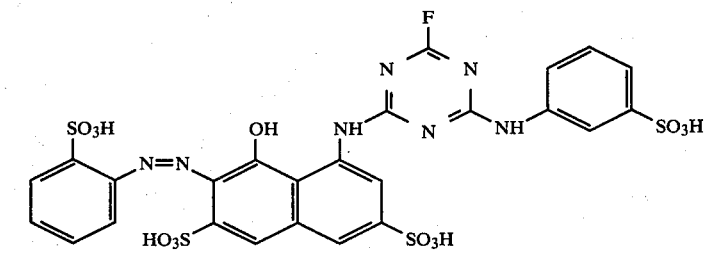

50 g of cotton hanks are dyed in 1 liter of a dye liquor, which contains 1.5 g of the above dyestuff, by heating the liquor to 40° in the course of 30 minutes, adding 50 g of sodium sulphate in several portions, then adding 20 which dyes cotton, by the dyeing process described in Example 1, in somewhat bluish-tinged red shades which are fast to wet processing, is obtained.

EXAMPLE 3

12.8 g of 1-amino-8-hydroxynaphthalene-3,6-disulphonic acid are dissolved in 200 ml of water at pH 5.8. After cooling the solution to 0°–5°, 3.8 g of cyanuric fluoride are added dropwise in the course of 10 minutes, and during this the pH value of the solution is kept at 4.0–4.5 by adding 20% strength sodium carbonate solution dropwise. The mixture is subsequently stirred for about 15 minutes and 4.3 g of m-toluidine are then added. The pH value is now kept at 5.5–6.0. After the condensation of the difluorotriazinyl component with the m-toluidine has ended, a diazonium salt suspension which has been obtained from 7.0 g of 2-aminobenzenesulphonic acid in 100 ml and 20 ml of concentrated hydrochloric acid with 20 ml of 2N sodium nitrite solution analogously to Example 2, is allowed to run in at 0°–5°.

The coupling is carried out at pH 7.0–7.5 and at 0°–10°. Finally, the temperature is allowed to rise to 20° C., the pH value is adjusted to 6.0, the dyestuff which has precipitated is further salted out with 100 g of sodium chloride and the suspension is subsequently stirred for 2 hours. After filtering off the dyestuff and washing the filter cake with 400 ml of 15% strength sodium chloride solution and finally with 200 ml of 10% strength sodium chloride solution, a dyestuff of the formula

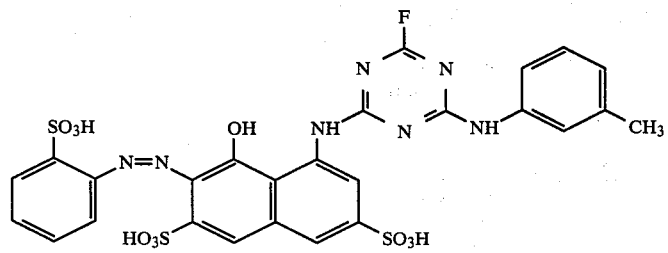

is obtained and is dried at 40° in vacuo.

The dyestuff dyes cellulose materials, by the dyeing process indicated in Example 1, in somewhat bluish-tinged red shades which are fast to light and very fast to wet processing.

EXAMPLE 4

12.8 g of 1-amino-8-hydroxynaphthalene-3,6-disulphonic acid are dissolved in 200 ml of water at pH 5.8 and, after cooling the solution to 0°–5°, are subjected to a condensation reaction with 3.8 ml of cyanuric fluoride, which is added dropwise, at pH 4.0–4.5. After subsequently stirring the mixture for ¼ of an hour, 4.4 g of 3-aminophenol are added and the pH value is then kept at 5.5–6.0. The temperature is allowed to rise to 20° in the course of 1 hour and the reaction is brought to completion.

8.9 g of 2-aminonaphthalene-1-sulphonic acid are dissolved in 150 ml of water at pH 7, 20 ml of concentrated hydrochloric acid are added and the mixture is cooled to 0°–5°. 20 ml of 2N sodium nitrite solution are then added dropwise. After subsequently stirring the mixture for one hour, excess nitrite is destroyed with amindosulphonic acid solution.

After renewed cooling of the solution, prepared above, of the coupling component, the diazonium compound is allowed to run in at 0°–10° and the pH value is kept at 7.5–8.0 for the coupling. The mixture is then warmed to 20° and adjusted to pH 5.0 with hydrochloric acid and the dyestuff is filtered off. The filter cake is washed with 10% strength sodium chloride solution until the runnings are almost colourless. The dyestuff, which corresponds to the formula

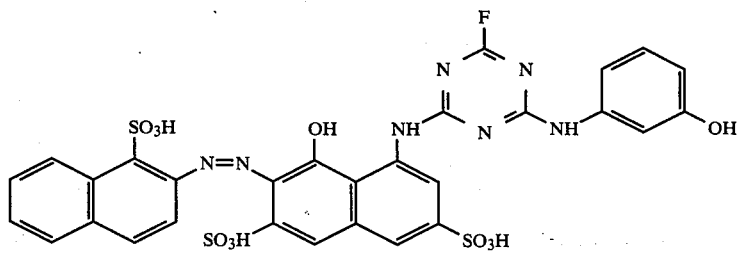

is dried at 40° in vacuo.

It dyes cotton, from a long liquor, in bluish-tinged red shades which have excellent fastness to wet processing.

EXAMPLE 5

12.8 g of 1-amino-8-hydroxynaphthalene-3,6-disulphonic acid are dissolved at pH 5.8 and are reacted with 3.8 ml of cyanuric fluoride as described in Example 3. 6.0 g of 4-aminoacetanilide are added to the resulting solution, the pH value is adjusted to 5.5–6.0 and the temperature is allowed to rise gradually from 0°–5° to 20°.

After the condensation has ended, the mixture is cooled again to 0°–5° and a suspension of the diazonium compound which has been obtained by diazotising 8.9 g of 2-aminonaphthalene-1-sulphonic acid as in Example 4 is allowed to run in. The coupling is carried out at pH 7.5–8.0 and at 0°–10°, the pH value in the suspension of crystals is then adjusted to 5.0 and the dyestuff is salted out still further with 50 g of sodium chloride, filtered off, washed with 15% strength sodium chloride until the runnings are almost colourless and dried at 40° in vacuo.

The resulting dyestuff corresponds to the formula

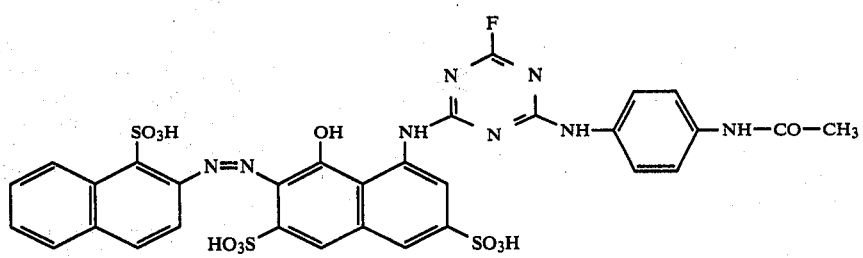

It dyes cotton, for example by the exhaustion process as is described in Example 1, in bluish-tinged red shades which have very good fastness to wet processing.

EXAMPLE 6

63.8 g of 1-amino-8-hydroxy-3,6-disulphonic acid are dissolved in 800 ml of water at pH 5.5 with sodium hydroxide solution, and the solution is cooled to 0°-5°. 18.2 ml of cyanuric fluoride are uniformly added dropwise to this solution in the course of about 15 minutes and the pH value is kept at 4.0-4.5 by adding 20% strength sodium carbonate solution dropwise. At the same time, intensive cooling ensures that the temperature does not rise above +5°. After the addition has ended, the mixture is subsequently stirred for about 15 minutes and a solution of 21.4 g of p-toluidine in 50 ml of acetone is then added dropwise in the course of a further 15 minutes. The pH value is kept at 5.5-6.0, the temperature is allowed to rise to 20° in the course of about 2 hours and the condensation reaction is brought to completion.

38.1 g of 2-aminobenzenesulphonic acid are diazotised in 400 ml of water and 40 ml of concentrated hydrochloric acid with 55 ml of 4N sodium nitrite solution as in Example 2.

The resulting diazonium salt suspension is uniformly added to the coupling component, prepared above, at 0°-10° in the course of about 15 minutes and the pH value is kept at 7.0-7.5 with 20% strength sodium carbonate solution for the purpose of coupling. After the coupling has ended, the temperature is allowed to rise to 20°, the pH value is adjusted to 5.0 with hydrochloric acid and the dyestuff is further salted out with 50 g of sodium chloride. The dyestuff is filtered off, washed with 10% strength sodium chloride solution until the runnings are slightly coloured, and dried at 50° in vacuo. It corresponds to the formula

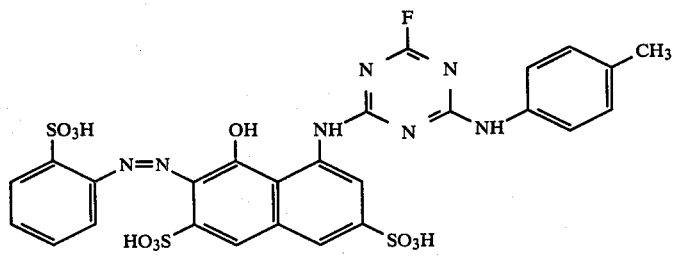

and dyes cotton, by the dyeing process of Example 1, in somewhat bluish-tinged red shades which have good fastness to light and wet processing.

EXAMPLE 7

12.8 g of 1-amino-8-hydroxynaphthalene-3,6-disulphonic acid in 200 ml of water are subjected to a condensation reaction with 3.8 ml of cyanuric fluoride at pH 4.0-4.5 and at 0°-5° as described in Example 3. 7.0 g of 4-aminobenzenesulphonic acid are added to the resulting solution and the pH value in the reaction mixture is kept at 5.5-6.0. The mixture is subsequently stirred at 0°-5° for one hour. A diazonium salt suspension which has been obtained from 7.0 g of 2-aminobenzenesulphonic acid in 100 ml of water and 20 ml of concentrated hydrochloric acid with 20 ml of 2N sodium nitrite solution at 0°-5° is then allowed to run in and the pH value is kept at 7.0-7.5 and the temperature at 0°-10° for the coupling. Finally, the temperature is increased to 20° in the course of 1 hour. After the coupling has ended, the dyestuff is salted out by adding 100 g of sodium chloride, filtered off and washed with 20% strength sodium chloride solution until the runnings are almost colourless. The dyestuff, which, in the form of the free acid, corresponds to the formula

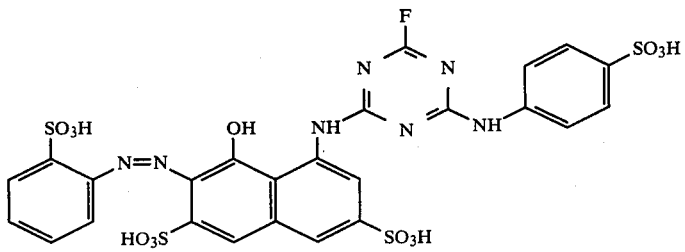

is dried at 40° in vacuo.

It dyes cotton, by the dyeing process of Example 1, in somewhat bluish-tinged red shades which have excellent fastness to wet processing and good fastness to light.

EXAMPLE 8

12.8 g of 1-amino-8-hydroxynaphthalene-3,6-disulphonic acid are dissolved in 200 ml of water and subjected to a condensation reaction with 3.8 ml of cyanuric fluoride at pH 4.0–4.5 and at 0°–5° as in Example 3. 6.0 g of 4-aminoacetanilide are then added and the pH value of the reaction mixture is kept at 5.5–6.0 with 20% strength sodium carbonate solution. The temperature is allowed to rise to 20° in the course of 2 hours and the mixture is then cooled again to below +10°.

7.0 g of 2-aminobenzenesulphonic acid are dissolved in 100 ml of water at 0°–5°, with neutralisation, and, after adding 20 ml of concentrated hydrochloric acid, are diazotised with 20 ml of 2N sodium nitrite solution. After destroying any excess of nitrite, the diazonium salt suspension is slowly added to the solution, obtained above, of the coupling component and the pH value is kept at 7.0–7.5. The temperature is allowed to rise to 20° in the course of a few hours and, after the coupling has ended, the dyestuff is salted out with 100 g of sodium chloride. The needles of the dyestuff which have precipitated are filtered off and washed with 10% strength sodium chloride solution. The dyestuff is dried at 50° in vacuo. It corresponds to the formula and any excess of nitrite is destroyed with amidosulphonic acid.

The suspension of the diazonium salt is now slowly added to the coupling component prepared above and the coupling is carried out at 0°–10° and pH 7.0–7.5. Finally, the temperature is allowed to rise to 20°, the pH value is adjusted to 6.0 with 10% strength hydrochloric acid and the dyestuff which has precipitated during the coupling is further salted out with 200 g of sodium chloride. After subsequently stirring the mixture for one hour, the small needles of the dyestuff, which corresponds to the formula

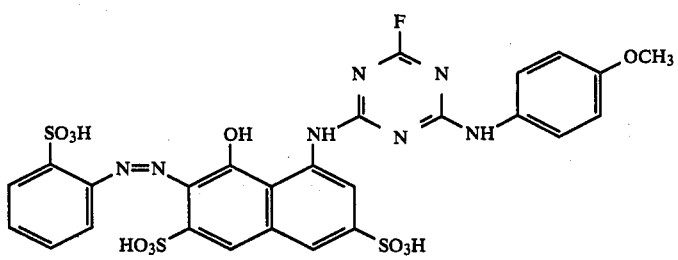

are filtered off, washed with 700 ml of 15% strength sodium chloride solution and 200 ml of 10% strength sodium chloride solution and dried at 40° in vacuo.

On cotton, by the process of Example 1, the dyestuff gives somewhat bluish-tinged red dyeings which have excellent fastness to wet processing and good fastness to light.

EXAMPLE 10

12.8 g of 1-amino-8-hydroxynaphthalene-3,6-disulphonic acid are dissolved in 200 ml of water at pH 5.5 and are subjected to a condensation reaction with 3.8 ml of cyanuric fluoride at 0°–5° and pH 4.0–4.5 according to Example 3. 4.4 g of 3-aminophenol are added to the solution of the condensation product and the pH value

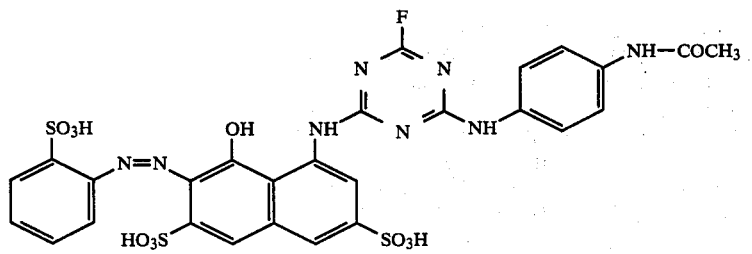

and dyes cotton, by the dyeing process of Example 1, in somewhat bluish-tinged red shades which have excellent fastness to light and wet processing.

EXAMPLE 9

12.8 g of 1-amino-8-hydroxynaphthalene-3,6-disulphonic acid are dissolved in 200 ml of water at pH 5.8 and are reacted with 3.8 ml of cyanuric fluoride at 0°–5° and pH 4.0–4.5 as described in Example 3. After the reaction has ended, a solution of 4.9 g of p-anisidine in 15 ml of acetone is added dropwise and the pH value in the reaction mixture is kept at 5.5–6.0.

7.0 g of 2-aminobenzenesulphonic acid are dissolved in 100 ml of water at pH 6. 20 ml of concentrated hydrochloric acid are added to the solution, the mixture is cooled to 0°–5° and the amine is diazobised by adding 20 ml of 2N sodium nitrite solution dropwise. The mixture is subsequently stirred until the diazotisation has ended, is adjusted to 5.5–6.0. The temperature is allowed to rise to 20° in the course of a few hours, whilst maintaining this pH value with the aid of 20% strength sodium carbonate solution, and after the reaction has ended the mixture is cooled again to below +10°.

7.0 g of 2-aminobenzenesulphonic acid are dissolved in 150 ml of water at 0°–5° and pH 7 and, after adding 20 ml of concentrated hydrochloric acid, are diazotised with 20 ml of 2N sodium nitrite solution. After the diazotisation has ended and excess nitrite has been destroyed with amidosulphonic acid, the suspension of the diazonium salt is allowed to run uniformly into the reactive coupling component prepared above and the pH value is kept at 7.0–7.5 for the purpose of coupling. After the coupling has ended, the mixture is warmed to 20° and adjusted to pH 5.0 with hydrochloric acid and the dyestuff which has partially precipitated is further salted out with 50 g of sodium chloride. It is filtered off, washed with 10% strength sodium chloride solution and dried at 50° in vacuo.

In the form of the free acid, it corresponds to the formula and dried at 50° in vacuo. It corresponds to the formula

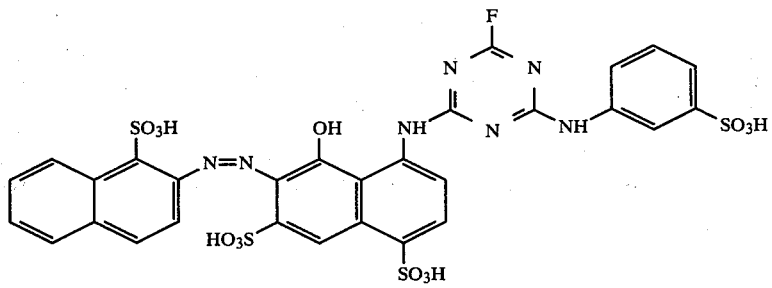

and dyes cotton, by the dyeing process of Example 1, in bluish-tinged red shades which have good fastness to light and very good fastness to wet processing.

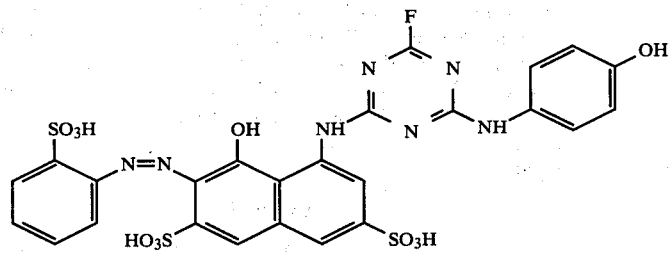

It dyes cotton, from a long liquor, in somewhat bluish-tinged red shades which have very good fastness to light and wet processing.

EXAMPLE 11

16.0 g of 1-amino-8-hydroxynaphthalene-4,6-disulphonic acid are dissolved in 200 ml of water at pH 6.0. The solution is cooled to 0°-5° and the pH value is adjusted to 3.5 with concentrated hydrochloric acid. 4.7 ml of cyanuric fluoride are added dropwise in the course of 10 minutes and the pH value is kept at 3.5-4.0 with 20% strength sodium carbonate solution. The mixture is subsequently stirred at 0°-5° and pH 4.0 for 15 minutes and 8.7 g of 3-aminobenzenesulphonic acid are then added. The condensation reaction between the difluorotriazinyl compound and the 3-aminobenzenesulphonic acid is brought to completion by adjusting the pH value to 5.5-6.0.

11.2 g of 2-aminonaphthalene-1-sulphonic acid are dissolved in 170 ml of water at pH 7. After cooling the solution to 0°-5° and adding 20 ml of concentrated hydrochloric acid, 25 ml of 2N sodium nitrite solution are added dropwise, the mixture is subsequently stirred for a further 1 hour at 0°-5° and excess nitrite is destroyed with amidosulphonic acid.

The diazonium salt suspension is slowly added, at 0°-10°, to the coupling component prepared above. The pH value is kept at 7.5-8.0 with 20% strength sodium carbonate solution and the temperature is allowed to rise to 20° in the course of 1 hour. The mixture is adjusted to pH 6.0 with hydrochloric acid and the dyestuff is salted out with 150 g of sodium chloride, filtered off, washed with 15% strength sodium chloride solution

EXAMPLE 12

12.8 g of 1-amino-8-hydroxynaphthalene-3,6-disulphonic acid are dissolved in 200 ml of water at pH 5.5 and are subjected to a condensation reaction with 3.8 ml of cyanuric fluoride, which has been added dropwise, at 0°-5°, the pH value in the reaction mixture being kept at 4.0-4.5 with 20% strength sodium carbonate solution during the condensation. After the reaction has ended, a solution of 4.7 g of p-toluidine in 10 ml of acetone is added dropwise, the pH value is now kept at 5.5-6.0 and the temperature is allowed to rise gradually to 20° in the course of 2 hours, after which the condensation reaction between the difluorotriazinyl compound and the p-toluidine has ended. The mixture is again cooled to 0°-10°.

12.1 g of 2-aminonaphthalene-1,5-disulphonic acid are dissolved in 150 ml of water at pH 6.0. The solution is cooled to 0°-5°, 20 ml of concentrated hydrochloric acid are added and the amine is diazotised by adding 20 ml of 2N sodium nitrite solution dropwise. After subsequently stirring the mixture at 0°-5° for one hour, excess nitrite is destroyed with amidosulphonic acid.

The diazonium compound is now slowly added to the suspension of the coupling component prepared above and the pH value in the coupling solution is kept at 7.0-7.5 with 20% strength sodium carbonate solution. After the coupling has ended, the temperature is allowed to rise to 20°, the pH value is adjusted to 5.0 with hydrochloric acid and the dyestuff is slowly salted out with 100 g of sodium chloride. The dyestuff is filtered off, washed with 15% strength sodium chloride solution and dried at 50° in vacuo. It corresponds to the formula

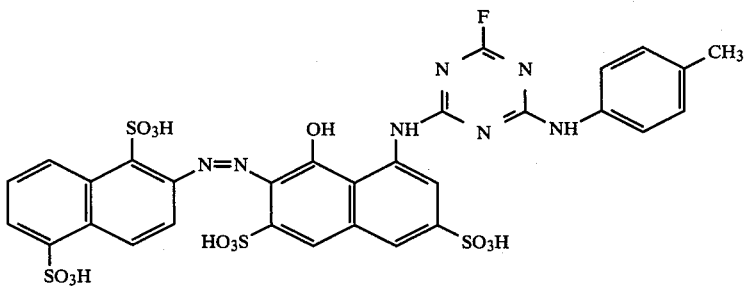

and dyes cotton, from a long liquor, in bluish-tinged red shades which have good fastness to light and very good fastness to wet processing.

EXAMPLE 13

If the 3-aminobenzenesulphonic acid in Example 11 is replaced by 8.7 g of 4-aminobenzenesulphonic acid and the procedure in all the reaction steps is as described in that Example, a dyestuff of the formula

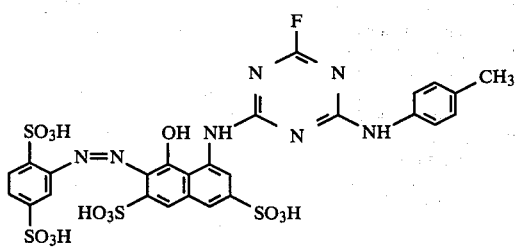

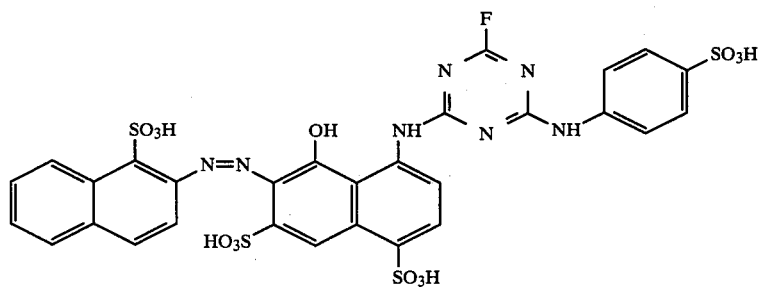

which has very similar coloristic properties to the dyestuff of Example 11 is obtained.

EXAMPLE 14

12.8 g of 1-amino-8-hydroxynaphthalene-3,6-disulphonic acid are first reacted, under the conditions given in Example 12, with 3.8 ml of cyanuric fluoride and the intermediate product formed is then subjected to a condensation reaction with 4.7 g of p-toluidine.

10.1 g of 2-aminobenzene-1,4-disulphonic acid are dissolved in 130 ml of water at pH 6. 15 ml of concentrated hydrochloric acid are added and 20 ml of 2N sodium nitrite solution are added dropwise at 0°–5°. The mixture is subsequently stirred for a further 1 hour and any excess of nitrite is destroyed with amidosulphonic acid.

The diazonium compound thus prepared is allowed to run into the above reactive coupling component at 0°–10° and the pH value is kept at 7.0–7.5 for the purpose of coupling. After the diazo component has been added, the mixture is subsequently stirred for about a further 1 hour, the temperature is then allowed to rise to 20° and the pH value is adjusted to 5.0. The dyestuff is salted out with 150 g of sodium chloride, filtered off, washed with 15% strength sodium chloride solution and dried at 50° in vacuo. It corresponds to the formula and dyes cotton in somewhat bluish-tinged red shades which have very good fastness to light and wet processing.

Further dyestuffs of the general formula

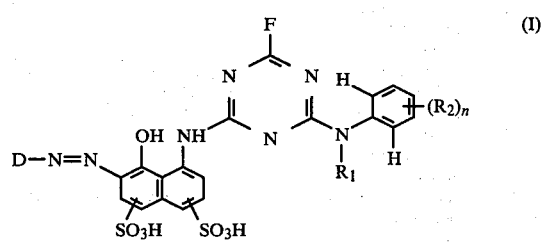

(I)

are built up according to the methods described in the preceding Examples by a condensation reaction between the 1-amino-8-hydroxynaphthalenedisulphonic acids listed in Table I, cyanuric fluoride and the aromatic amines

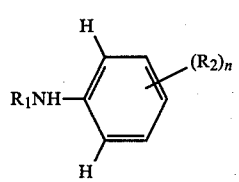

and subsequent coupling of the resulting reactive coupling components with the diazotised amines D-NH₂.

TABLE 1

| No. | Diazo component D-NH$_2$ | 1-Amino-8-hydroxynaphthalene-disulphonic acid | Aromatic amine 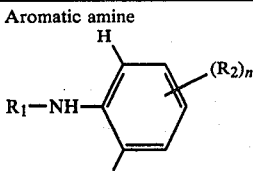 |
|---|---|---|---|
| 15 | 2-Aminobenzenesulphonic acid | 1-Amino-8-hydroxynaphthalene-3,6-disulphonic acid | 3-Aminoacetanilide |
| 16 | 2-Aminobenzenesulphonic acid | 1-Amino-8-hydroxynaphthalene-3,6-disulphonic acid | 1-Amino-benzenesulphonamide |
| 17 | 2-Aminobenzenesulphonic acid | 1-Amino-8-hydroxynaphthalene-3,6-disulphonic acid | 1-Amino-3-methylbenzene |
| 18 | 2-Aminobenzenesulphonic acid | 1-Amino-8-hydroxynaphthalene-3,6-disulphonic acid | 5-Amino-2-ethoxybenzenesulphonic acid |
| 19 | 2-Aminobenzenesulphonic acid | 1-Amino-8-hydroxynaphthalene-3,6-disulphonic acid | 1-Amino-3-methoxybenzene |
| 20 | 2-Aminobenzenesulphonic acid | 1-Amino-8-hydroxynaphthalene-3,6-disulphonic acid | 4-Aminophenylmethanesulphonic acid |
| 21 | 2-Aminobenzenesulphonic acid | 1-Amino-8-hydroxynaphthalene-3,6-disulphonic acid | 5-Amino-2-hydroxybenzenesulphonic acid |
| 22 | 2-Aminobenzenesulphonic acid | 1-Amino-8-hydroxynaphthalene-3,6-disulphonic acid | 4-Amino-2-hydroxybenzenesulphonic acid |
| 23 | 2-Aminobenzenesulphonic acid | 1-Amino-8-hydroxynaphthalene-3,6-disulphonic acid | 4-Aminobenzoic acid |
| 24 | 2-Aminonaphthalene-1-sulphonic acid | 1-Amino-8-hydroxynaphthalene-3,6-disulphonic acid | 1-Amino-4-methylbenzene |
| 25 | 2-Aminonaphthalene-1-sulphonic acid | 1-Amino-8-hydroxynaphthalene-3,6-disulphonic acid | 3-Aminoacetanilide |
| 26 | 2-Aminonaphthalene-1-sulphonic acid | 1-Amino-8-hydroxynaphthalene-3,6-disulphonic acid | 5-Amino-2-ethoxybenzenesulphonic acid |
| 27 | 2-Aminonaphthalene-1-sulphonic acid | 1-Amino-8-hydroxynaphthalene-3,6-disulphonic acid | 1-Amino-3-hydroxyacetylaminobenzene |
| 28 | 2-Aminonaphthalene-1-sulphonic acid | 1-Amino-8-hydroxynaphthalene-3,6-disulphonic acid | 2-Amino-4-sulphobenzoic acid |
| 29 | 2-Aminobenzene-1,4-disulphonic acid | 1-Amino-8-hydroxynaphthalene-3,6-disulphonic acid | 4-Amino-benzoic acid ethyl ester |
| 30 | 2-Aminobenzene-1,4-disulphonic acid | 1-Amino-8-hydroxynaphthalene-3,6-disulphonic acid | 3-Aminophenol |
| 31 | 2-Aminobenzene-1,4-disulphonic acid | 1-Amino-8-hydroxynaphthalene-3,6-disulphonic acid | 1-Amino-4-methoxybenzene |
| 32 | 4-Aminobenzene-1,3-disulphonic acid | 1-Amino-8-hydroxynaphthalene-3,6-disulphonic acid | 3-Aminophenylurea |
| 33 | 4-Aminobenzene-1,3-disulphonic acid | 1-Amino-8-hydroxynaphthalene-3,6-disulphonic acid | 1-Amino-4-methylbenzene |
| 34 | 4-Aminobenzene-1,3-disulphonic acid | 1-Amino-8-hydroxynaphthalene-3,6-disulphonic acid | 3-Aminobenzenesulphamide |
| 35 | 2-Amino-4-acetylaminobenzenesulphonic acid | 1-Amino-8-hydroxynaphthalene-3,6-disulphonic acid | 4-Aminobenzoic acid |
| 36 | 2-Amino-4-acetylaminobenzenesulphonic acid | 1-Amino-8-hydroxynaphthalene-3,6-disulphonic acid | 3-Aminobenzenesulphonic acid |
| 37 | 2-Amino-4-acetylaminobenzenesulphonic acid | 1-Amino-8-hydroxynaphthalene-3,6-disulphonic acid | 1-Amino-4-methylbenzene |
| 38 | 2-Amino-5-chlorobenzenesulphonic acid | 1-Amino-8-hydroxynaphthalene-3,6-disulphonic acid | 4-Aminobenzenesulphonic acid |
| 39 | 2-Amino-5-sulphobenzoic acid | 1-Amino-8-hydroxynaphthalene-3,6-disulphonic acid | 3-Aminobenzenesulphonic acid |
| 40 | 2-Aminobenzenesulphonic acid | 1-Amino-8-hydroxynaphthalene-3,6-disulphonic acid | 3-Methylaminobenzenesulphonic acid |
| 41 | 2-Aminobenzenesulphonic acid | 1-Amino-8-hydroxynaphthalene-3,6-disulphonic acid | 3-Aminophenyloxamic acid |
| 42 | 2-Aminobenzenesulphonic acid | 1-Amino-8-hydroxynaphthalene-3,6-disulphonic acid | 1-Amino-4-(2-hydroxyethoxy)-benzene |
| 43 | 2-Amino-5-methoxybenzenesulphonic acid | 1-Amino-8-hydroxynaphthalene-3,6-disulphonic acid | 3-Aminobenzenesulphonic acid |
| 44 | 2-Amino-5-methoxybenzenesulphonic acid | 1-Amino-8-hydroxynaphthalene-4,6-disulphonic acid | 1-Amino-3,4-dimethylbenzene |
| 45 | 2-Aminobenzenesulphonic acid | 1-Amino-8-hydroxynaphthalene-4,6-disulphonic acid | 1-Amino-4-methylbenzene |
| 46 | 2-Aminobenzenesulphonic acid | 1-Amino-8-hydroxynaphthalene-4,6-disulphonic acid | 1-Amino-3-methylbenzene |

TABLE 1-continued

Aromatic amine

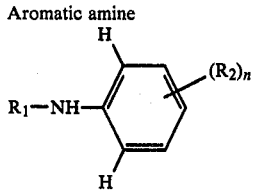

| No. | Diazo component D-NH$_2$ | 1-Amino-8-hydroxynaphthalene-disulphonic acid | |
|---|---|---|---|
| 47 | 2-Aminobenzene-sulphonic acid | 1-Amino-8-hydroxynaphthalene-4,6-disulphonic acid | 3-Aminobenzenesulphonic acid |
| 48 | 2-Aminobenzene-sulphonic acid | 1-Amino-8-hydroxynaphthalene-4,6-disulphonic acid | 4-Aminobenzene acid methyl ester |
| 49 | 2-Aminobenzene-sulphonic acid | 1-Amino-8-hydroxynaphthalene-4,6-disulphonic acid | 4-Aminobenzenesulphonic acid |
| 50 | 2-Aminobenzene-sulphonic acid | 1-Amino-8-hydroxynaphthalene-4,6-disulphonic acid | 4-Aminophenylurea |
| 51 | 2-Aminobenzene-sulphonic acid | 1-Amino-8-hydroxynaphthalene-4,6-disulphonic acid | 4-Aminoacetanilide |
| 52 | 2-Aminobenzene-sulphonic acid | 1-Amino-8-hydroxynaphthalene-4,6-disulphonic acid | 1-Amino-4-methoxybenzene |
| 53 | 2-Aminobenzene-sulphonic acid | 1-Amino-8-hydroxynaphthalene-4,6-disulphonic acid | 1-Amino-4-chlorobenzene |
| 54 | 2-Aminobenzene-sulphonic acid | 1-Amino-8-hydroxynaphthalene-4,6-disulphonic acid | 3-Aminobenzonitrile |
| 55 | 2-Aminobenzene-sulphonic acid | 1-Amino-8-hydroxynaphthalene-4,6-disulphonic acid | 4-Aminobenzamide |
| 56 | 2-Aminonaphthalene-1-sulphonic acid | 1-Amino-8-hydroxynaphthalene-4,6-disulphonic acid | 4-Aminobenzenesulphonamide |
| 57 | 2-Aminonaphthalene-1-sulphonic acid | 1-Amino-8-hydroxynaphthalene-4,6-disulphonic acid | 3-Aminobenzenesulphonic acid (2-hydroxyethyl)-amide |
| 58 | 2-Aminonaphthalene-1-sulphonic acid | 1-Amino-8-hydroxynaphthalene-4,6-disulphonic acid | 1-Amino-4-methoxyethoxybenzene |
| 59 | 2-Aminonaphthalene-1-sulphonic acid | 1-Amino-8-hydroxynaphthalene-4,6-disulphonic acid | 3-Aminobenzenesulphonamide |
| 60 | 2-Aminonaphthalene-1-sulphonic acid | 1-Amino-8-hydroxynaphthalene-4,6-disulphonic acid | 3-Amino-N—(phenylsulphonyl)-benzenesulphonamide |
| 61 | 2-Aminonaphthalene 1-sulphonic acid | 1-Amino-8-hydroxynaphthalene-4,6-disulphonic acid | 1-Amino-3-methoxybenzene |
| 62 | 2-Aminonaphthalene-1-sulphonic acid | 1-Amino-8-hydroxynaphthalene-4,6-disulphonic acid | 1-Amino-4-(2-hydroxyethoxy)-benzene |
| 63 | 2-Aminonaphthalene-1-sulphonic acid | 1-Amino-8-hydroxynaphthalene-4,6-disulphonic acid | 1-Amino-3-methylbenzene |
| 64 | 2-Aminonaphthalene-1-sulphonic acid | 1-Amino-8-hydroxynaphthalene-4,6-disulphonic acid | 1-Aminobenzenesulphonic acid dimethylamide |
| 65 | 2-Aminobenzene-1,4-disulphonic acid | 1-Amino-8-hydroxynaphthalene-4,6-disulphonic acid | 1-Amino-3-methylbenzene |
| 66 | 4-Aminobenzene-1,3-disulphonic | 1-Amino-8-hydroxynaphthalene-4,6-disulphonic acid | 1-Amino-4-methylbenzene |
| 67 | 2-Aminonaphthalene-1,5-disulphonic acid | 1-Amino-8-hydroxynaphthalene-4,6-disulphonic acid | 1-Amino-4-methoxybenzene |
| 68 | 2-Aminonaphthalene-1,5-disulphonic acid | 1-Amino-8-hydroxynaphthalene-4,6-disulphonic acid | 1-Amino-4-methylbenzene |
| 69 | 2-Aminonaphthalene-1,5-disulphonic acid | 1-Amino-8-hydroxynaphthalene-3,6-disulphonic acid | 1-Amino-3-methylbenzene |
| 70 | 2-Aminonaphthalene-1,5-disulphonic acid | 1-Amino-8-hydroxynaphthalene-3,6-disulphonic acid | 1-Amino-3,4-dimethylbenzene |
| 71 | 2-Aminonaphthalene-1,5-disulphonic acid | 1-Amino-8-hydroxynaphthalene-3,6-disulphonic acid | 3-Aminobenzenesulphonic acid |
| 72 | 2-Aminonaphthalene-1,5-disulphonic acid | 1-Amino-8-hydroxynaphthalene-3,6-disulphonic acid | 1-Amino-4-ethoxybenzene |
| 73 | 2-Aminonaphthalene-1,5-disulphonic acid | 1-Amino-8-hydroxynaphthalene-3,6-disulphonic acid | 4-Aminobenzenesulphonic acid methylamide |
| 74 | 2-Aminonaphthalene-1,5-disulphonic acid | 1-Amino-8-hydroxynaphthalene-3,6-disulphonic acid | 1-Methylamino-3-methylbenzene |
| 75 | 2-Aminonaphthalene-1,5-disulphonic acid | 1-Amino-8-hydroxynaphthalene-3,6-disulphonic acid | 4-Methylaminobenzoic acid |
| 76 | 2-Aminonaphthalene-1,5-disulphonic acid | 1-Amino-8-hydroxynaphthalene-3,6-disulphonic acid | 3-Aminoacetanilide |
| 77 | 2-Aminonaphthalene-1,5-disulphonic acid | 1-Amino-8-hydroxynaphthalene-3,6-disulphonic acid | 1-Amino-4-methoxybenzene |
| 78 | 2-Aminonaphthalene-1,5-disulphonic acid | 1-Amino-8-hydroxynaphthalene-3,6-disulphonic acid | 5-Amino-2-ethoxybenzenesulphonic acid |
| 79 | 2-Amino-5-chloro-benzenesulphonic acid | 1-Amino-8-hydroxynaphthalene-3,6-disulphonic acid | 5-Amino-2-methylbenzenesulphonic acid |
| 80 | 2-Aminobenzene-sulphonic acid | 1-Amino-8-hydroxynaphthalene-3,6-disulphonic acid | 3-Methylamino-4-methylbenzene-sulphonic acid |
| 81 | 5-Acetylamino-2-aminobenzene-sulphonic acid | 1-Amino-8-hydroxynaphthalene-3,6-disulphonic acid | 3-Aminobenzenesulphonic acid |
| 82 | 4-Acetylamino-2- | 1-Amino-8-hydroxynaphthalene- | 3-Aminobenzenesulphonic acid |

TABLE 1-continued

Aromatic amine

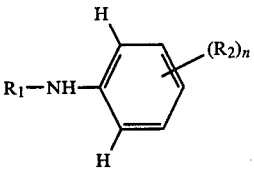

| No. | Diazo component D-NH$_2$ | 1-Amino-8-hydroxynaphthalene-disulphonic acid | |
|---|---|---|---|
| | aminobenzenesulphonic acid | 4,6-disulphonic acid | |
| 83 | 2-Aminobenzene-1,4-disulphonic acid | 1-Amino-8-hydroxynaphthalene-4,6-disulphonic acid | 1-Amino-4-methylbenzene |
| 84 | 2-Aminobenzene-1-sulphonic acid | 1-Amino-8-hydroxynaphthlene-4,6-disulphonic acid | 1-Amino-3,4-dimethylbenzene |
| 85 | 2-Aminobenzene-1-sulphonic acid | 1-Amino-8-hydroxynaphthlene-4,6-disulphonic acid | 1-Amino-3-chlorobenzene |
| 86 | 2-Aminobenzene-1-sulphonic acid | 1-Amino-8-hydroxynaphthalene-4,6-disulphonic acid | 3-Aminophenylmethanesulphonic acid |
| 87 | 2-Aminobenzene-1-sulphonic acid | 1-Amino-8-hydroxynaphthalene-4,6-disulphonic acid | 3-Amino-5,6-dimethylbenzene-sulphonic acid |
| 88 | 2-Aminobenzene-1-sulphonic acid | 1-Amino-8-hydroxynaphthalene-3,6-disulphonic acid | 5-Amino-2-methylbenzene-sulphonic |
| 89 | 2-Aminobenzene-1-sulphonic acid | 1-Amino-8-hydroxynaphthalene-3,5-disulphonic acid | 3-Aminophenol |
| 90 | 2-Aminobenzene-1-sulphonic acid | 1-Amino-8-hydroxynaphthalene-3,5-disulphonic acid | 3-Aminobenzenesulphonic acid |
| 91 | 2-Aminobenzene-1-sulphonic acid | 1-Amino-8-hydroxynaphthalene-3,5-disulphonic acid | 1-Amino-4-methylbenzene |
| 92 | 2-Aminobenzene-1-sulphonic acid | 1-Amino-8-hydroxynaphthalene-3,5-disulphonic acid | 4-Aminoacetanilide |
| 93 | 2-Aminobenzene-1,4-disulphonic acid | 1-Amino-8-hydroxynaphthalene-3,5-disulphonic acid | 1-Amino-3-methylbenzene |
| 94 | 2-Aminonaphthalene-1-sulphonic acid | 1-Amino-8-hydroxynaphthalene-3,5-disulphonic acid | 4-Aminobenzenesulphonic acid |
| 95 | 2-Aminonaphthalene-1,5-disulphonic acid | 1-Amino-8-hydroxynaphthalene-3,5-disulphonic acid | 1-Amino-4-methylbenzene |
| 96 | 2-Aminonaphthalene-1,5-disulphonic acid | 1-Amino-8-hydroxynaphthalene-3,5-disulphonic acid | 1-Amino-4-methoxybenzene |
| 97 | 4-Aminobenzene-1,3-disulphonic acid | 1-Amino-8-hydroxynaphthalene-3,5-disulphonic acid | 1-Amino-4-methylbenzene |
| 98 | 4-Aminobenzene-1,3-disulphonic acid | 1-Amino-8-hydroxynaphthalene-3,5-disulphonic acid | 1-Amino-3-hydroxyacetylaminobenzene |
| 99 | 2-Amino-4-acetyl-aminobenzenesulphonic acid | 1-Amino-8-hydroxynaphthalene-3,5-disulphonic acid | 4-Aminobenzenesulphonic acid |
| 100 | 2-Amino-4-acetyl-aminobenzenesulphonic acid | 1-Amino-8-hydroxynaphthalene-3,6-disulphonic acid | " |
| 101 | 3-aminonaphthalene-1,5-disulphonic acid | 1-Amino-8-hydroxynaphthalene-3,6-disulphonic acid | 3-Aminobenzenesulphonic acid |
| 102 | 3-Aminonaphthalene-1,5-disulphonic acid | 1-Amino-8-hydroxynaphthalene-3,6-disulphonic acid | 1-Amino-4-methylbenzene |
| 103 | 4-Aminobenzene-sulphonic acid | 1-Amino-8-hydroxynaphthalene-3,6-disulphonic acid | 4-Aminobenzenesulphonic acid |
| 104 | 3-Aminobenzene-sulphonic acid | 1-Amino-8-hydroxynaphthalene-3,6-disulphonic acid | 3-Aminobenzenesulphonic acid |
| 105 | 4-Aminobenzene-sulphonic acid | 1-Amino-8-hydroxynapthalene-3,6-disulphonic acid | " |
| 106 | 6-Amino-5-methyl-benzene-1,3-disulphonic acid | 1-Amino-8-hydroxynaphthalene-3,6-disulphonic acid | 1-Amino-4-methylbenzene |
| 107 | 2-Amino-5-methyl-benzenesulphonic acid | 1-Amino-8-hydroxynaphthalene-3,6-disulphonic acid | 3-Aminobenzenesulphonic acid |
| 108 | 2-Amino-4-chloro-benzenesulphonic acid | 1-Amino-8-hydroxynaphthalene-3,6-disulphonic acid | 4-Aminobenzenesulphonic acid |
| 109 | 2-Amino-3,5-dimethylbenzene-sulphonic acid | 1-Amino-8-hydroxynaphthalene-3,6-disulphonic acid | " |
| 110 | 2-Aminobenzoic acid | 1-Amino-8-hydroxynaphthalene-3,6-disulphonic acid | 3-Aminobenzenesulphonic acid |
| 111 | 2-Aminonaphthalene-1,7-disulphonic acid | 1-Amino-8-hydroxynaphthalene-3,6-disulphonic acid | 1-Amino-4-methylbenzene |
| 112 | 2-Aminonaphthalene-3,6-disulphonic acid | 1-Amino-8-hydroxynaphthalene-3,6-disulphonic acid | 3-Aminobenzenesulphonic acid |
| 113 | 4-Aminonaphthalene-1-sulphonic acid | 1-Amino-8-hydroxynaphthalene-3,6-disulphonic acid | 4-Aminobenzenesulphonic acid |
| 114 | 4-Aminonaphthalene-1,3-disulphonic acid | 1-Amino-8-hydroxynaphthalene-3,6-disulphonic acid | 1-Amino-4-methoxybenzene |
| 115 | 7-Aminonaphthalene- | 1-Amino-8-hydroxynaphthalene- | 1-Amino-4-methylbenzene |

TABLE 1-continued

Aromatic amine

R₁—NH—[benzene ring with H's and (R₂)n]

| No. | Diazo component D-NH₂ | 1-Amino-8-hydroxynaphthalene- disulphonic acid | |
|---|---|---|---|
| | 1,3,6-trisulphonic acid | 3,6-disulphonic acid | |
| 116 | Aniline | 1-Amino-8-hydroxynaphthalene-3,6-disulphonic acid | 5-Aminobenzene-1,3-disulphonic acid |
| 117 | 1-Amino-4-(sulpho-acetyl)-aminobenzene | 1-Amino-8-hydroxynaphthalene-3,6-disulphonic acid | 3-Aminobenzenesulphonic acid |
| 118 | 3-Aminonaphthalene-2,6-disulphonic acid | 1-Amino-8-hydroxynaphthalene-4,6-disulphonic acid | 3-Aminophenol |
| 119 | 2-Aminobenzene-sulphonic acid | 1-Amino-8-hydroxy-2,4-disulphonic acid | 3-Aminobenzenesulphonic acid |
| 120 | 2-Aminobenzene-sulphonic acid | 1-Amino-8-hydroxy-2,4-disulphonic acid | 1-Amino-4-methylbenzene |
| 121 | 2-Aminonaphthalene-1-sulphonic acid | 1-Amino-8-hydroxy-2,4-disulphonic acid | 4-Aminobenzenesulphonic acid |

EXAMPLE 122

12.8 g of 1-amino-8-hydroxynaphthalene-3,6-disulphonic acid are dissolved in 200 ml of water at pH 5.8 and the solution is cooled to 0°–5°. 3.8 ml of cyanuric fluoride are uniformly added dropwise in the course of 10 minutes and the pH value in the solution is kept at 4.0–4.5 with 20% strength sodium carbonate solution. After the condensation reaction has ended, 7.0 g of 3-aminobenzenesulphonic acid are added to the mixture and the pH value is now kept at 5.5–6.0. 8.9 g of 2-aminonaphthalene-1-sulphonic acid are dissolved in 150 ml of water of pH 7, the solution is cooled to 0°–5° and 20 ml of concentration hydrochloric acid are added. The diazotisation is now carried out by adding 20 ml of 2N sodium nitrite solution drowise. The diazonium salt suspension formed is subsequently stirred at 0°–5° for a further 1 hour and any nitrite still present is destroyed with amidosulphonic acid.

The suspension, thus obtained, of the diazonium salt is allowed to run slowly into the solution, prepared above, of the coupling component at 0°–10°, and during this the pH value in the coupling solution is kept at 7.5–8.0. The temperature is then allowed to rise to 20° in the course of about 2 hours, the mixture is adjusted to pH 6.5 with hydrochloric acid and the dyestuff which has precipitated is filtered off and washed with 5% strength sodium chloride solution.

The dyestuff, which corresponds to the formula

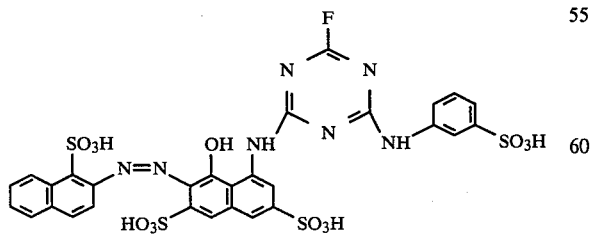

is dried at 50° in vacuo. It dyes cotton, from a long liquor, in bluish-tinged red shades which have good fastness to light and very good fastness to wet processing.

EXAMPLE 123

12.8 g of 1-amino-8-hydroxynaphthalene-3,6-disulphonic acid are subjected to a condensation reaction with 3.8 ml of cyanuric fluoride as in Example 122. After the reaction has ended, 4.3 g of m-toluidine are added at 0°–5° and the pH value is then kept at 5.5–6.0. with 20% strength sodium carbonate solution. The temperature is allowed to rise to 20° in the course of 2 hours and the mixture is subsequently stirred at 20° for ½ an hour. The mixture is then cooled to 0°–5°.

A diazonium salt suspension prepared from 8.9 g of 2-aminonaphthalene-1-sulphonic acid in the manner described in Example 122 is now allowed to run into the mixture and the pH in the coupling mixture is kept at 7.5–8.0. After the coupling has ended, the mixture is warmed to 20°, the pH value is adjusted to 6.0 with hydrochloric acid and the dyestuff, which has precipitated in the form of crystals, is filtered off. It is washed with 10% strength sodium chloride solution and dried at 50° in vacuo.

It corresponds to the formula

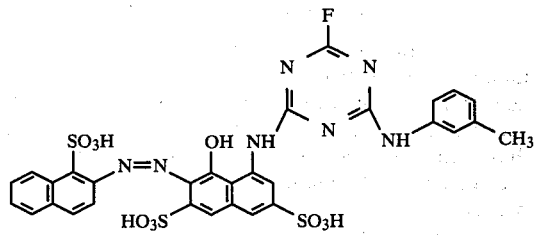

and dyes cotton, from a long liquor, in bluish-tinged red shades which are distinguished by good fastness to wet processing.

EXAMPLE 124

8.0 g of 3-aminobenzenesulphonic acid are suspended in 70 ml of water. The suspension is adjusted to pH 3.5 with sodium hydroxide solution and the mixture is cooled to 0°–5°. 4.2 ml of cyanuric fluoride are added dropwise in the course of 15 minutes, whilst stirring well, and the pH value is kept at 3.2–3.5 with 20% strength sodium carbonate solution. After subsequently stirring for 15 minutes, the reaction has ended and a clear solution has formed. The solution is adjusted to pH 5.5, a solution of 12.8 g of 1-amino-8-hydroxynaphthalene-3,6-disulphonic acid in 200 ml of water, which has been adjusted to pH 5.5, is now added dropwise at 0°–5° and the pH value is further kept at 5.5–5.8 with 20% strength sodium carbonate solution.

When the condensation reaction has ended, after a few hours, a diazonium salt suspension which has been prepared from 7.0 g of 2-aminobenzenesulphonic acid in 100 ml of water and 20 ml of concentrated hydrochloric acid with 20 ml of 2N sodium nitrite solution is slowly added and the pH value in the reaction mixture is kept at 7.0–7.5 with 20% strength sodium carbonate solution.

The temperature is kept at 0°–10° and, after 2 hours, is gradually increased to 20°. The pH value is adjusted to 6.0, the dyestuff is salted out with 100 g of sodium chloride and the suspension is subsequently stirred for 2 hours. The dyestuff, which corresponds to the formula

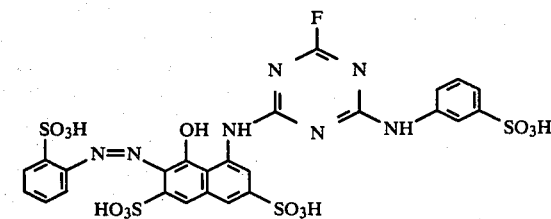

is filtered off, washed with 15% strength sodium chloride solution and dried at 50° in vacuo. It dyes cotton in somewhat bluish-tinged red shades.

EXAMPLE 125

If a diazonium salt suspension which has been obtained from 8.9 g of 2-aminonaphthalene-1-sulphonic acid in 150 ml of water and 20 ml of concentrated hydrochloric acid by diazotisation with 20 ml of 2N sodium nitrite solution is used in Example 124 instead of the diazotised 2-aminobenzenesulphonic acid and the procedure in all the reaction steps is otherwise completely analogous, a dyestuff of the formula which dyes cotton in more intensely bluish-tinged red shades than the dyestuff of Example 124 is obtained.

EXAMPLE 126

15.1 g of 2-(2'-sulphophenylazo)-8-amino-1-hydroxynaphthalene-3,6-disulphonic acid are dissolved, in the form of the trisodium salt, in 300 ml of water. The pH value of the solution is adjusted to 4.5 and the solution is cooled to 0°–5°. 3.1 ml of cyanuric fluoride are then added dropwise, whilst stirring well. The pH value is kept at 4.0–4.5 and, after the dropwise addition, the mixture is stirred for a further 30 minutes.

3.8 g of p-toluidine are dissolved in 10 ml of acetone and the solution is added dropwise to the difluorotriazinyl-azo dyestuff. The pH value is kept at 5.5–6.0 with sodium carbonate solution and, after 2 hours, the temperature is allowed to rise gradually to 20°. After the condensation reaction has ended, the dyestuff is salted out with 40 g of sodium chloride, filtered off and washed with 10% strength sodium chloride solution. It corresponds to the formula

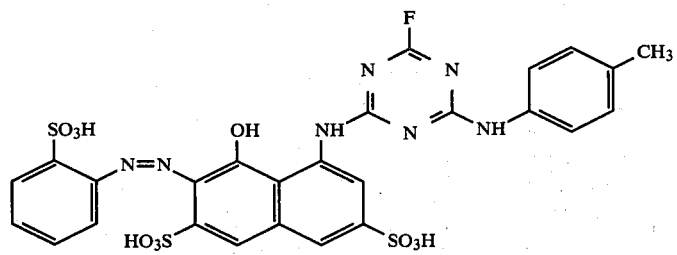

and dyes cotton, from a long liquor, in somewhat bluish-tinged red shades.

EXAMPLE 127

12.8 g of 1-amino-8-hydroxynaphthalene-3,6-disulphonic acid are first subjected to a condensation reaction, in the manner described in Example 7, with 3.8 ml of cyanuric fluoride and the resulting intermediate product is subjected to a condensation reaction with 7.0 g of 4-aminobenzenesulphonic acid. 9.6 g of 2-amino-4-acetylaminobenzenesulphonic acid are dissolved in 150 ml of water of pH 6. After cooling the solution to 0°–5°, 20 ml of concentrated hydrochloric acid are added and 20 ml of 2N sodium nitrite solution are now added dropwise. After the dropwise addition, the mixture is stirred for a further 1 hour and any excess of nitrite still present is destroyed with amidosulphonic acid.

The diazonium compound is allowed to run slowly into the solution, prepared above, of the coupling component, and during this a pH value of 7.0–7.5 is maintained by adding sodium carbonate solution. Towards the end of the coupling, the temperature is allowed to rise gradually to 20°, the pH value is adjusted to 5.5

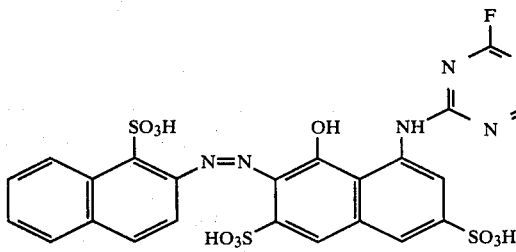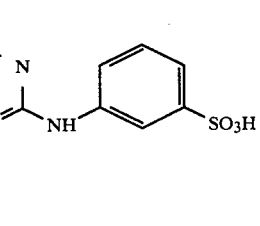

with hydrochloric acid and the dyestuff is salted out with 100 g of sodium chloride. It is filtered off, washed with 20% strength sodium chloride solution and dried at 50° in vacuo.

It corresponds to the formula

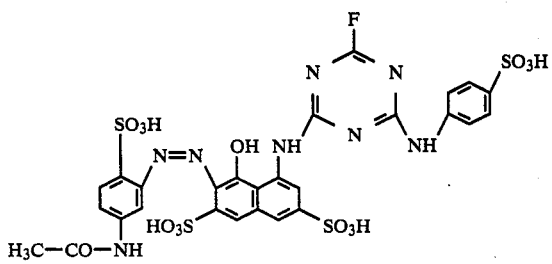

and dyes cotton, from a long liquor, at 40°, in bluish-tinged red colour shades which are fast to light and wet processing.

EXAMPLE 128

34.1 g of 1-amino-8-hydroxynaphthalene-3,6-disulphonic acid are dissolved in 400 ml of water at pH 5.5. After cooling the solution to 0°–5°, 9.2 ml of cyanuric fluoride are added dropwise in the course of 10 minutes, and during this the pH value in the solution is kept at 4.0–4.5 with 20% strength sodium carbonate solution. The mixture is subsequently stirred under the same conditions for ½ an hour and 38.0 g of the disodium salt of 3-aminonaphthalene-1,5-disulphonic acid are then introduced. The pH value is adjusted to 5.5 and the temperature is further kept at 0°–5°. The condensation reaction has ended after about 1 hour.

18.4 g of 2-aminobenzenesulphonic acid are dissolved in 200 ml of water at pH 6.5. The solution is cooled to 0°–5°, 30 ml of concentrated hydrochloric acid are added and 54 ml of 2N sodium nitrite solution are added dropwise. The mixture is subsequently stirred at 0°–5° for ½–1 hour and any excess of nitrite still present is destroyed with amidosulphonic acid solution.

The resulting suspension of the diazo compound is added dropwise, at 0°–10°, to the reactive coupling component prepared above and the pH value is kept at 7.0–7.5 with 20% strength sodium carbonate solution. After the coupling has ended, the temperature is allowed to rise to 20°, the pH value is adjusted to 6.5 with 10% strength hydrochloric acid and the dyestuff is slowly salted out with 200 g of sodium chloride. After subsequently stirring the suspension for half an hour, the dyestuff is filtered off, washed with 15% strength sodium chloride solution and dried at 40° in vacuo. In the form of the free acid, it corresponds to the formula

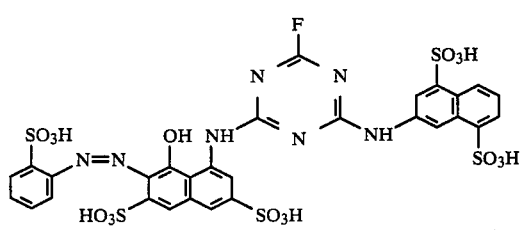

50 g of cotton hanks are dyed in 1 liter of a dye liquor, which contains 1.5 g of the above dyestuff, by heating the liquor to 40° in the course of 30 minutes, adding 50 g of sodium sulphate in several portions, then adding 20 g of sodium carbonate and treating the material at this temperature for 60 minutes. After rinsing, soaping at the boil and drying, a bluish-tinged red dyeing which has good fastness to light and is very fast to wet processing is obtained.

EXAMPLE 129

34.1 g of 1-amino-8-hydroxynaphthalene-3,6-disulphonic acid are dissolved in 400 ml of water at pH 5.5. After cooling the solution to 0°–5°, 9.2 ml of cyanuric fluoride are added dropwise in the course of 10 minutes, and during this the pH value in the solution is kept at 4.0–4.5 by adding 20% strength sodium carbonate solution dropwise. The solution is subsequently stirred at this pH value and at 0°–5° for ½ an hour and 24.5 g of 5-aminonaphthalene-2-sulphonic acid are then added. The ph value of the solution kept at 5.5–6.0 with sodium carbonate solution and the temperature is gradually increased to 20° in the course of 2 hours. After the condensation reaction has ended, the mixture is again cooled to 0°–10° and the suspension of a diazonium compound which has been obtained from 18.4 g of 2-aminobenzenesulphonic acid in 200 ml of water and 30 ml of concentrated hydrochloric acid with 54 ml of 2N sodium nitrite solution in the manner shown in the Example is now added.

The pH value is adjusted to 7.0–7.5 for the coupling and is further kept within these limits with 20% strength sodium carbonate solution. The temperature is allowed to rise to 20° in the course of 3 hours. After the coupling has ended, the pH value is adjusted to 6.5 and the dyestuff, which has already precipitated, is further salted out gradually with 100 g of sodium chloride. The dyestuff is filtered off, washed with 7% strength sodium chloride solution and dried at 40° in vacuo. In the form of the free acid, it corresponds to the formula

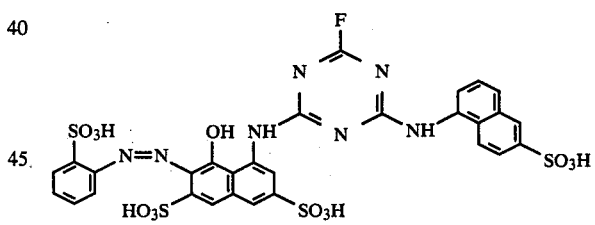

When this dyestuff is dyed onto cotton by the process of Example 1, bluish-tinged red dyeings which are fast to wet processing and light are likewise obtained.

EXAMPLE 130

If 24.5 g of 5-aminonaphthalene-1-sulphonic acid are used in Example 2 instead of 5-aminonaphthalene-2-sulphonic acid and the procedure in all the process steps is analogous, a dyestuff of the formula

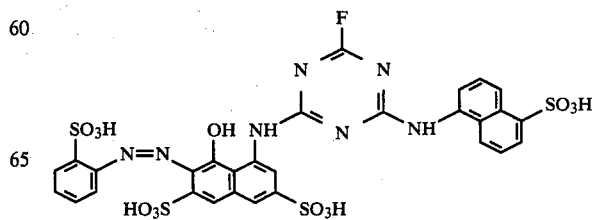

which dyes cotton, from a long liquor by the dyeing process of Example 1, in a bluish-tinged red shade is obtained.

EXAMPLE 131

34.1 g of 1-amino-8-hydroxynaphthalene-3,6-disulphonic acid are dissolved in 400 ml of water at pH 5.5. The solution is reacted with 9.2 ml of cyanuric fluoride at 0°–5° in the manner indicated in Example 1. After the reaction has ended, 33.4 g of 5-aminonaphthalene-1,3-disulphonic acid are added to the solution and the pH value is kept at 5.5 with 20% strength sodium carbonate solution. The temperature is allowed to rise to 20° in the course of 2 hours. After this period, the condensation reaction of the difluorotriazinyl component with the aminonaphthalenedisulphonic acid had ended. The solution is again cooled to 0°–10° and a suspension of a diazonium salt which has been prepared from 18.4 g of 2-aminobenzenesulphonic acid in 200 ml of water and 30 ml of concentrated hydrochloric acid with 54 ml of 2N sodium nitrite solution as in Example 1 is gradually added. During the introduction of the diazonium compound, a pH value of 7.0–7.5 is maintained in the coupling mixture with 20% strength sodium carbonate. The temperature is then allowed to rise to 20° in the course of 3 hours, whilst further controlling the pH. After the coupling has ended, the pH value is adjusted to 6.5, the dyestuff is salted out with 200 g of sodium chloride and the suspension is subsequently stirred for 2 hours. The dyestuff is filtered off, washed with 20% strength sodium chloride solution and covered twice with 15% strength sodium chloride solution. After drying at 40° in vacuo, a dyestuff of the formula

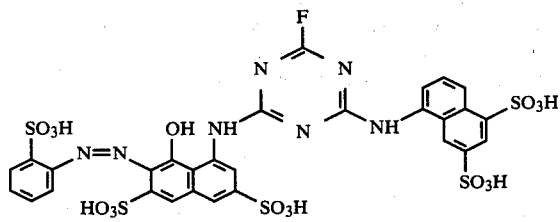

which dyes cotton, from a long liquor, in bluish-tinged red shades which are fast to wet processing and light is obtained.

EXAMPLE 132

34.1 g of 1-amino-8-hydroxynaphthalene-3,6-disulphonic acid are first reacted, in the manner shown in Example 1, with 9.2 ml of cyanuric fluoride at 0°–5° and pH 4.0–4.5 and 33.4 g of 7-aminonaphthalene-1,3-disulphonic acid are then added to the resulting solution of the difluorotriazinyl compound formed. The pH value is kept at 5.5–6.0 with 20% strength sodium carbonate solution.

23.8 g of 2-aminonaphthalene-1-sulphonic acid are dissolved in 280 ml of water at pH 7. The solution is cooled to 0°–5°, 30 ml of concentrated hydrochloric acid are added and 54 ml of 2N sodium nitrite solution are added dropwise in the course of 1 hour. After subsequently stirring the mixture for ½ an hour, excess nitrite is removed with amidosulphonic acid solution.

The diazonium compound is now allowed to run gradually into the solution of the coupling component prepared above, and during this the pH value is kept at 7.5–8.0 with 20% strength sodium carbonate solution. The temperature is allowed to rise to 20° in the course of 2 hours, and, after the coupling has ended, the pH value is adjusted to 6.0, and the dyestuff is salted out with 210 g of sodium chloride. After subsequently stirring the mixture for several hours, the dyestuff is filtered off, washed with 20% strength sodium chloride solution and dried at 40° in vacuo. In the form of the free acid, it corresponds to the formula

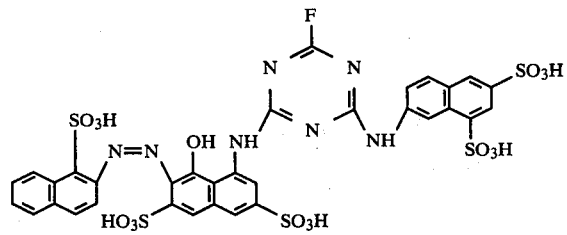

and dyes cotton, from a long liquor, in distinctly bluish-tinged red shades which are fast to wet processing and light.

EXAMPLE 133

34.1 g of 1-amino-8-hydroxynaphthalene-3,6-disulphonic acid are subjected to a condensation reaction, analogously to Example 1, with 9.2 ml of cyanuric fluoride at 0°–5° and pH 4.0–4.5. 24.5 g of 6-aminonaphthalene-2-sulphonic acid are added to the resulting solution and the pH value is then kept at 5.5–6.0 with 20% strength sodium carbonate solution. The temperature is increased to 20° in the course of 3 hours and the resulting solution is cooled to below 10°.

32.4 g of 2-aminonaphthalene-1,5-disulphonic acid are dissolved in 300 ml of water at pH 6.0. This solution is cooled to 0°–5°, 30 ml of concentrated hydrochloric acid are added and the amine is then diazotised with 54 ml of 2N sodium nitrite solution. After subsequently stirring for 1 hour, excess nitrite is removed with amidosulphonic acid.

The diazonium salt solution is now gradually added to the coupling component prepared above and the pH value in the coupling mixture is kept at 7.0–7.5 with 20% strength sodium carbonate solution. After the coupling has ended, the temperature is allowed to rise to 20°, the pH value is adjusted to 6.0 with dilute hydrochloric acid and the dyestuff is salted out with 220 g of sodium chloride. After subsequently stirring the suspension for 2–3 hours, the dyestuff is filtered off, washed with 15% strength sodium chloride solution and dried at 40° in vacuo. It corresponds to the formula

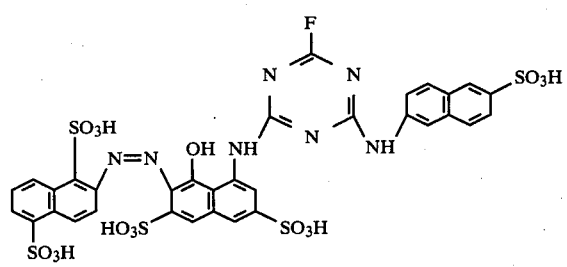

and dyes cotton, from a long liquor, in quite bluish-tinged red shades which are fast to wet processing.

EXAMPLE 134

34.1 g of 1-amino-8-hydroxynaphthalene-3,6-disulphonic acid are subjected to a condensation reaction, as described in Example 1, with 9.2 ml of cyanuric fluoride at 0°–5° and pH 4.0–4.5. 24.5 g of 4-aminonaphthalene-1-sulphonic acid are added to the resulting solution and the pH value is then kept at 5.5–6.0 with 20% strength sodium carbonate. The condensation reaction is brought to completion by allowing the temperature to rise slowly to 20° in the course of 3 hours, and the mixture is then again cooled to below 10°. 27.1 g of 2-aminobenzene-1,4-disulphonic acid are dissolved in 200 ml of water at pH 6. The solution is cooled to 0°–5° and 30 ml of concentrated hydrochloric acid are added. 54 ml of 2N sodium nitrite solution are now allowed to run into the solution in the course of 1 hour and the mixture is subsequently stirred for a further 1 hour. Thereafter, any excess of nitrite is destroyed with amidosulphonic acid.

The resulting diazonium compound is added to the solution, prepared above, of the coupling component at 0°–10° and the pH value in the reaction mixture is kept at 7.0–7.5 with sodium carbonate solution. After adding the diazonium salt solution, the mixture is further stirred at this pH value for 1 hour, the temperature is then allowed to rise to 20° and the pH value is adjusted to 6.0 with dilute hydrochloric acid. The dyestuff is salted out with 200 g of sodium chloride, filtered off and washed with 15% strength sodium chloride solution. After drying in vacuo at 40°, a product is obtained which dyes cotton, from a long liquor, in bluish-tinged red shades which are fast to wet processing, which may be assigned the formula

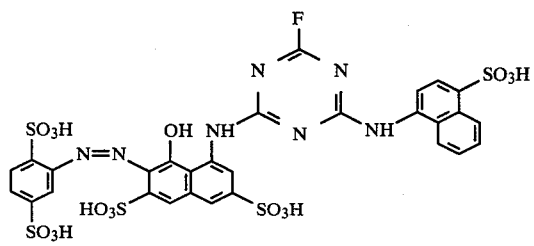

EXAMPLE 135

34.1 g of 1-amino-8-hydroxynaphthalene-4,6-disulphonic acid are dissolved in 400 ml of water at pH 6.0. After cooling the solution to 0°–5°, the pH value is adjusted to 3.5 with hydrochloric acid. 9.2 ml of cyanuric fluoride are now added dropwise in the course of 10 minutes and the pH value is kept at 3.5–4.0 with 20% strength sodium carbonate solution. The mixture is subsequently stirred under the conditions indicated for a further 15 minutes and 24.5 g of 6-aminonaphthalene-1-sulphonic acid are then added to the resulting solution. The condensation reaction between the difluorotriazinyl compound and the aminonaphthalenesulphonic acid is carried out by adjusting and maintaining a pH value of 5.5–6.0, the temperature being allowed to rise from 0°–5° to 20° in the course of 3 hours.

18.4 g of 2-aminobenzenesulphonic acid are dissolved in 200 ml of water at pH 6.5. After adding 30 ml of concentrated hydrochloric acid and cooling the mixture to 0°–5°, the amine is diazotised with 54 ml of 2N sodium nitrite solution and the excess of nitrite is destroyed with amidosulphonic acid solution.

The resulting diazonium salt suspension is now gradually added to the coupling component prepared above and the pH value is kept at 7.5–8.0 with 20% strength sodium carbonate solution and the temperature is kept below 10°. The mixture is further stirred for 1 hour and the temperature is then allowed to rise to 20° in the course of a further hour. After the coupling has ended, the pH value is adjusted to 6.0 with dilute hydrochloric acid and the dyestuff is salted out with 180 g of sodium chloride. It is filtered off, washed with 15% strength sodium chloride solution and dried at 40° in vacuo.

In the form of the free acid, it corresponds to the formula

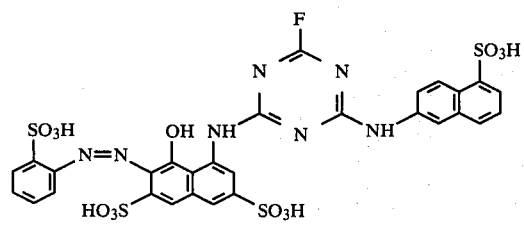

and dyes cotton, from a long liquor, in bluish-tinged red shades which are fast to wet processing.

Dyestuffs of the formula

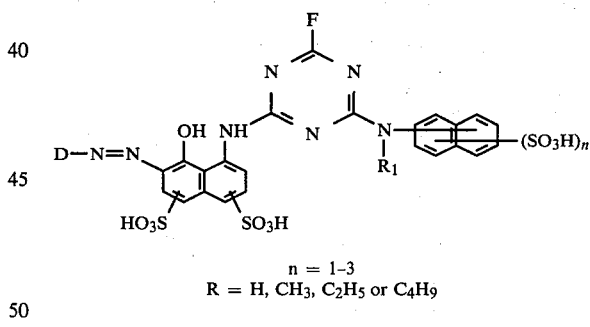

$n = 1-3$
$R = H, CH_3, C_2H_5$ or $C_4H_9$ can be synthesised in an analogous manner when the aminohydroxynaphthalenedisulphonic acids given in Table I, column 2, are subjected to a condensation reaction with cyanuric fluoride, the resulting intermediate products are reacted with the aminonaphthalenesulphonic acids given in the third column and the products are then coupled with the diazotised amines D-NH$_2$ given in the fourth column.

TABLE I

| Example No. | 1-Amino-8-hydroxynaphthalene-disulphonic acid | | D-NH$_2$ |
|---|---|---|---|
| 136 | 1-Amino-8-hydroxynaphthalene-3,6-disulphonic acid | 6-Aminonaphthalene-1-sulphonic acid | 2-Aminobenzenesulphonic acid |
| 137 | 1-Amino-8-hydroxynaphthalene-3,6-disulphonic acid | 1-Aminonaphthalene-1-sulphonic acid | 2-Aminobenzenesulphonic acid |

TABLE I-continued

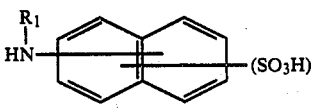

| Example No. | 1-Amino-8-hydroxynaphthalene-disulphonic acid | (middle component) | D-NH₂ |
|---|---|---|---|
| 138 | 1-Amino-8-hydroxynaphthalene-3,6-disulphonic acid | 8-Aminonaphthalene-1-sulphonic acid | 2-Aminobenzenesulphonic acid |
| 139 | 1-Amino-8-hydroxynaphthalene-3,6-disulphonic acid | 6-Aminonaphthalene-2-sulphonic acid | 2-Aminobenzenesulphonic acid |
| 140 | 1-Amino-8-hydroxynaphthalene-3,6-disulphonic acid | 7-Methylaminonaphthalene-2-sulphonic acid | 2-Aminobenzenesulphonic acid |
| 141 | 1-Amino-8-hydroxynaphthalene-3,6-disulphonic acid | 7-Ethylaminonaphthalene-2-sulphonic acid | 2-Aminobenzenesulphonic acid |
| 142 | 1-Amino-8-hydroxynaphthalene-3,6-disulphonic acid | 8-Aminonaphthalene-2-sulphonic acid | 2-Aminobenzenesulphonic acid |
| 143 | 1-Amino-8-hydroxynaphthalene-3,6-disulphonic acid | 7-Aminonaphthalene-1,3-disulphonic acid | 2-Aminobenzenesulphonic acid |
| 144 | 1-Amino-8-hydroxynaphthalene-3,6-disulphonic acid | 6-Aminonaphthalene-1,3-disulphonic acid | 2-Aminobenzenesulphonic acid |
| 145 | 1-Amino-8-hydroxynaphthalene-3,6-disulphonic acid | 4-Aminonaphthalene-2,6-disulphonic acid | 2-Aminobenzenesulphonic acid |
| 146 | 1-Amino-8-hydroxynaphthalene-3,6-disulphonic acid | 7-Aminonaphthalene-1,3,5-trisulphonic acid | 2-Aminobenzenesulphonic acid |
| 147 | 1-Amino-8-hydroxynaphthalene-4,6-disulphonic acid | 6-Aminonaphthalene-2-sulphonic acid | 2-Aminobenzenesulphonic acid |
| 148 | 1-Amino-8-hydroxynaphthalene-4,6-disulphonic acid | 5-Aminonaphthalene-1-sulphonic acid | 2-Aminobenzenesulphonic acid |
| 149 | 1-Amino-8-hydroxynaphthalene-4,6-disulphonic acid | 7-Aminonaphthalene-1,3-disulphonic acid | 2-Aminobenzenesulphonic acid |
| 150 | 1-Amino-8-hydroxynaphthalene-4,6-disulphonic acid | 5-Aminonaphthalene-1,3-disulphonic acid | 2-Aminonaphthalene-1-sulphonic acid |
| 151 | 1-Amino-8-hydroxynaphthalene-4,6-disulphonic acid | 5-Aminonaphthalene-1-sulphonic acid | 2-Aminobenzene-1,4-disulphonic acid |
| 152 | 1-Amino-8-hydroxynaphthalene-4,6-disulphonic acid | 6-Aminonaphthalene-1-sulphonic acid | 2-Aminonaphthalene-1,5-disulphonic acid |
| 153 | 1-Amino-8-hydroxynaphthalene-4,6-disulphonic acid | 3-Aminonaphthalene-1,5-disulphonic acid | 2-Aminonaphthalene-1-sulphonic acid |
| 154 | 1-Amino-8-hydroxynaphthalene-4,6-disulphonic acid | 7-Aminonaphthalene-1,3-disulphonic acid | 2-Amino-4-acetylbenzenesulphonic acid |
| 155 | 1-Amino-8-hydroxynaphthalene-4,6-disulphonic acid | 7-Aminonaphthalene-1,3,5-trisulphonic acid | 2-Amino-5-methoxybenzenesulphonic acid |
| 156 | 1-Amino-8-hydroxynaphthalene-2,4-disulphonic acid | 7-Aminonaphthalene-1,3-disulphonic acid | 2-Aminobenzenesulphonic acid |
| 157 | 1-Amino-8-hydroxynaphthalene-2,4-disulphonic acid | 6-Aminonaphthalene-2-sulphonic acid | 2-Aminobenzenesulphonic acid |
| 158 | 1-Amino-8-hydroxynaphthalene-2,4-disulphonic acid | 3-Aminonaphthalene-1,5-disulphonic acid | 2-Aminonaphthalene-1-sulphonic acid |
| 159 | 1-Amino-8-hydroxynaphthalene-3,6-disulphonic acid | 4-Aminonaphthalene-2,7-disulphonic acid | 2-Aminonaphthalene-1-sulphonic acid |
| 160 | 1-Amino-8-hydroxynaphthalene-3,6-disulphonic acid | 7-Aminonaphthalene-1,3,5-trisulphonic acid | 2-Aminonaphthalene-1-sulphonic acid |
| 161 | 1-Amino-8-hydroxynaphthalene-3,6-disulphonic acid | 6-Aminonaphthalene-1-sulphonic acid | 2-Aminonaphthalene-1-sulphonic acid |
| 162 | 1-Amino-8-hydroxynaphthalene-3,6-disulphonic acid | 6-Aminonaphthalene-2-sulphonic acid | 2-Aminonaphthalene-1-sulphonic acid |
| 163 | 1-Amino-8-hydroxynaphthalene-3,6-disulphonic acid | 7-Methylaminonaphthalene-2-sulphonic acid | 2-Aminonaphthalene-1-sulphonic acid |
| 164 | 1-Amino-8-hydroxynaphthalene-3,6-disulphonic acid | 7-Butylaminonaphthalene-2-sulphonic acid | 4-Aminobenzene-1,3-disulphonic acid |
| 165 | 1-Amino-8-hydroxynaphthalene-3,6-disulphonic acid | 5-Aminonaphthalene-1,3-disulphonic acid | 2-Amino-5-acetylaminobenzenesulphonic acid |
| 166 | 1-Amino-8-hydroxynaphthalene-3,6-disulphonic acid | 5-Aminonaphthalene-1-sulphonic acid | 3-Aminonaphthalene-1,5-disulphonic acid |
| 167 | 1-Amino-8-hydroxynaphthalene-3,6-disulphonic acid | 3-Aminonaphthalene-1,5-disulphonic acid | 2-Amino-5-chlorobenzenesulphonic acid |
| 168 | 1-Amino-8-hydroxynaphthalene-3,5-disulphonic acid | 5-Aminonaphthalene-1,3-disulphonic acid | 2-Aminonaphthalene-1-sulphonic acid |
| 169 | 1-Amino-8-hydroxynaphthalene-3,5-disulphonic acid | 8-Aminonaphthalene-2-sulphonic acid | 2-Aminobenzenesulphonic acid |
| 170 | 1-Amino-8-hydroxynaphthalene-3,5-disulphonic acid | 6-Aminonaphthalene-1,3-disulphonic acid | 2-Amino-4-chlorobenzenesulphonic acid |
| 171 | 1-Amino-8-hydroxynaphthalene-3,5-disulphonic acid | 6-Aminonaphthalene-1-sulphonic acid | 2-Amino-5-methylbenzenesulphonic acid |
| 172 | 1-Amino-8-hydroxynaphthalene-3,6-disulphonic acid | 7-Isobutylaminonaphthalene-2-sulphonic acid | 2-Aminobenzenesulphonic acid |

EXAMPLE 173

37.3 g of 3-aminonaphthalene-2,7-disulphonic acid are dissolved in 300 ml of water at pH 7. The pH value is adjusted to 5.0, the solution is cooled to 0°–5° and 11.0 ml of cyanuric fluoride are now added dropwise in the course of 15 minutes. The pH value is kept at 5.0–5.5 with 20% strength sodium carbonate solution. After the dropwise addition, the mixture is subsequently stirred for a further 20 minutes at 0°–5° and pH 5.0 and a solution, adjusted to pH 5, of 34.1 g of 1-amino-8-hydroxynaphthalene-3,6-disulphonic acid in 400 ml of water is then allowed to run into the resulting solution. The pH value is kept at 5.5–6.0 with 20% strength sodium carbonate solution and the condensation reaction between the difluorotriazinylaminonaphthalenedisulphonic acid and the aminohydroxynaphthalenedisulphonic acid is brought to completion by subsequently stirring the mixture for several hours.

A diazonium salt suspension which has been prepared from 18.4 g of 2-aminobenzenesulphonic acid in 200 ml of water and 30 ml of concentrated hydrochloric acid with 54 ml of 2N sodium nitrite solution according to Example 1 is now added to the solution, prepared above, of the coupling component at 0°–10° and the pH value in the reaction mixture is kept at 7.0–7.5 by means of 20% strength sodium carbonate solution. The temperature is allowed to rise gradually to 20° in the course of 2 hours and after the coupling has ended the pH value is adjusted to 6.5.

The dyestuff is salted out by adding 270 g of sodium chloride and, after subsequently stirring the mixture for a short time, is filtered off, washed with 15% strength sodium chloride solution and dried at 40° in vacuo.

In the form of the free acid, it corresponds to the formula

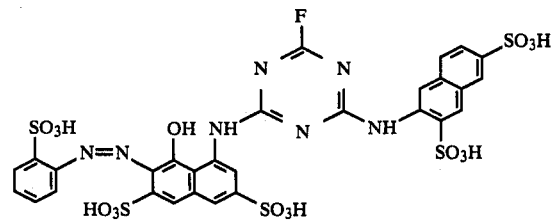

and it dyes cotton, from a long liquor, in bluish-red shades which are fast to wet processing and light.

Dyestuffs of the formula

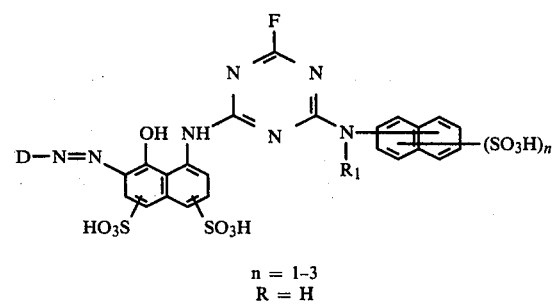

n = 1–3
R = H can be built up in an analogous manner if, instead of the 3-aminonaphthalene-2,7-disulphonic acid, the aminonaphthalenesulphonic acids of the formula

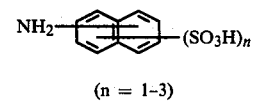

(n = 1–3)

listed in column 2 of Table II are subjected to a condensation reaction with cyanuric fluoride, the difluorotriazinylaminonaphthalenesulphonic acids formed are subjected to a condensation reaction with the amino group of 1-amino-8-hydroxynaphtha-lenedisulphonic acids (column 3) and the resulting products, which can undergo coupling, are coupled with the diazotised amines D—NH$_2$ of column 4.

TABLE II

| Example No. | [aminonaphthalene-(SO$_3$H)$_n$ with HN-R$_1$] | 1-Amino-8-hydroxynaphthalene-disulphonic acid | D-NH$_2$ |
|---|---|---|---|
| 174 | 2-Aminonaphthalene-1-sulphonic acid | 1-Amino-8-hydroxynaphthalene-3,6-disulphonic acid | 2-Aminobenzene-sulphonic acid |
| 175 | 2-Aminonaphthalene-1,5-disulphonic acid | 1-Amino-8-hydroxynaphthalene-3,6-disulphonic acid | 1-Aminobenzene-sulphonic acid |
| 176 | 2-Aminonaphthalene-1,7-disulphonic acid | 1-Amino-8-hydroxynaphthalene-3,6-disulphonic acid | 2-Aminobenzene-sulphonic acid |
| 177 | 4-Aminonaphthalene-1,3-disulphonic acid | 1-Amino-8-hydroxynaphthalene-3,6-disulphonic acid | 2-Aminobenzene-sulphonic acid |
| 178 | 1-Aminonaphthalene-2-sulphonic acid | 1-Amino-8-hydroxynaphthalene-3,6-disulphonic acid | 2-Aminobenzene-sulphonic acid |
| 179 | 6-Aminonaphthalene-2-sulphonic acid | 1-Amino-8-hydroxynaphthalene-3,6-disulphonic acid | 2-Aminobenzene-sulphonic acid |
| 180 | 4-Aminonaphthalene-1-sulphonic acid | 1-Amino-8-hydroxynaphthalene-3,6-disulphonic acid | 2-Aminobenzene-sulphonic acid |
| 181 | 4-Aminonaphthalene-2-sulphonic acid | 1-Amino-8-hydroxynaphthalene-3,6-disulphonic acid | 2-Aminobenzene-1,4-disulphonic acid |
| 182 | 3-Aminonaphthalene-1-sulphonic acid | 1-Amino-8-hydroxynaphthalene-3,6-disulphonic acid | 2-Aminobenzene-sulphonic acid |
| 183 | 7-Aminonaphthalene-2-sulphonic acid | 1-Amino-8-hydroxynaphthalene-3,6-disulphonic acid | 2-Aminobenzene-sulphonic acid |
| 184 | 2-Aminonaphthalene- | 1-Amino-8-hydroxynaphthalene- | 2-Aminonaphthalene- |

TABLE II-continued

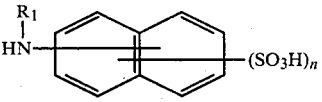

| Example No. | | 1-Amino-8-hydroxynaphthalene- disulphonic acid | D-NH$_2$ |
|---|---|---|---|
| | 1-sulphonic acid | 3,6-disulphonic acid | 1-sulphonic acid |
| 185 | 2-Aminonaphthalene-1,5-disulphonic acid | 1-Amino-8-hydroxynaphthalene-3,6-disulphonic acid | 2-Aminonaphthalene-1-sulphonic acid |
| 186 | 7-Aminonaphthalene-1,3,6-trisulphonic acid | 1-Amino-8-hydroxynaphthalene-3,6-disulphonic acid | 2-Aminonaphthalene-1-sulphonic acid |
| 187 | 2-Aminonaphthalene-1,5-disulphonic acid | 1-Amino-8-hydroxynaphthalene-4,6-disulphonic acid | 2-Aminonaphthalene-1-sulphonic acid |
| 188 | 3-Aminonaphthalene-1,5-disulphonic acid | 1-Amino-8-hydroxynaphthalene-4,6-disulphonic acid | 2-Aminonaphthalene-1-sulphonic acid |
| 189 | 2-Aminonaphthalene-1-sulphonic acid | 1-Amino-8-hydroxynaphthalene-4,6-disulphonic acid | 2-Aminobenzene-sulphonic acid |
| 190 | 3-Aminonaphthalene-2,7-disulphonic acid | 1-Amino-8-hydroxynaphthalene-4,6-disulphonic acid | 2-Aminobenzene-sulphonic acid |
| 191 | 3-Aminonaphthalene-2,6-disulphonic acid | 1-Amino-8-hydroxynaphthalene-4,6-disulphonic acid | 2-Aminobenzene-sulphonic acid |

EXAMPLE 192

25.0 g of 2-(2'-sulphophenylazo)-8-amino-1-hydroxynaphthalene-3,6-disulphonic acid are dissolved, in the form of the trisodium salt, in 500 ml of water. The pH value of the solution is adjusted to 4.5 and the solution is cooled to 0°–5°. 5.0 ml of cyanuric fluoride are now added dropwise in the course of 10 minutes and the pH value is kept at 4.0–4.5 with 20% strength sodium carbonate solution. The reaction is brought to completion by subsequently stirring the mixture for 10 minutes.

13.1 g of 7-aminonaphthalene-1-sulphonic acid are then added to the solution and the pH value is adjusted to 5.5–6.0. The mixture is now further stirred at 0°–5° and pH 5.5–6.0 until no more difluorotriazinyl-azo dyestuff can be detected in a chromatogram. The mixture is then warmed to 20°. The dyestuff is salted out with 180 g of sodium chloride, filtered off and washed with 15% strength sodium chloride solution. It is dried at 40° in vacuo. The dyestuff dyes cotton, from a long liquor by the dyeing process of Example 1, in bluish-tinged red shades which have good fastness to wet processing and light. In the form of the free acid, it corresponds to the formula

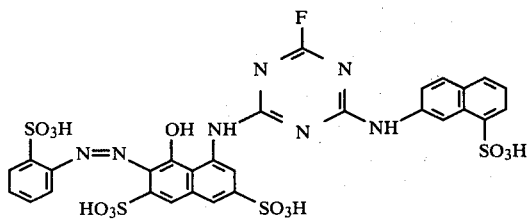

We claim:
1. Reactive dyestuffs of the formula

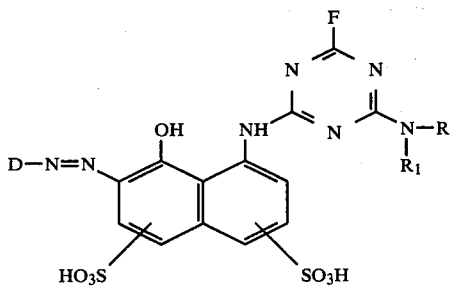

wherein
R is

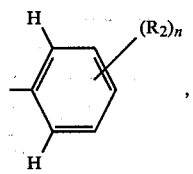

D is a naphthyl substituent which is unsubstituted or substituted by 1 to 3 sulfo groups,
R$_1$ is hydrogen or alkyl,
R$_2$ is halogen, alkyl, alkoxy or acetylamino and
n is 1, 2 or 3.

2. Reactive dyestuffs according to claim 1, characterised in that D represents 1-sulpho-2-naphthyl, 1,5-disulpho-2-naphthyl, 1,7-disulpho-2-naphthyl, 1,5-disulpho-3-naphthyl, 2,6-disulpho-3-naphthyl, 3,6-disulpho-2-naphthyl, 1,3-disulpho-7-naphthyl, 1,3-disulpho-6-naphthyl, 1-sulpho-4-naphthyl, 1-sulpho-5naphthyl, 1-sulpho-6-naphthyl, 3,7-disulpho-1-naphthyl, 1,3-disulpho-4-naphthyl, 1,3,5-trisulpho-6-naphthyl, 1,3,6-trisulpho-7-naphthyl or 1,3,6-trisulpho-4-naphthyl.

3. Reactive dyestuffs of the formula

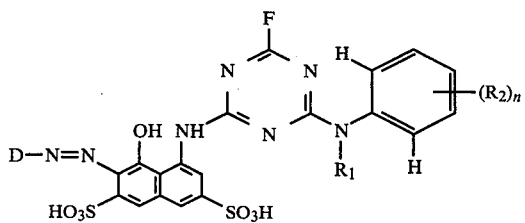
wherein D, $R_1$, $R_2$ and n have the meaning indicated in claim 1.
4. Reactive dyestuffs of the formula
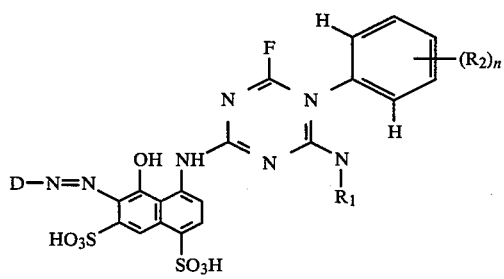
wherein D, $R_1$, $R_2$ and n have the meaning indicated in claim 1.
5.
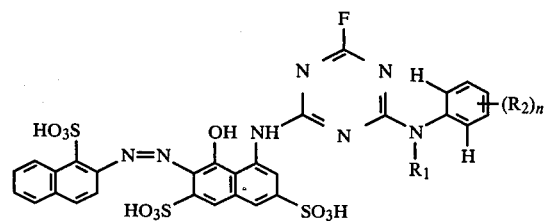
wherein $R_1$, $R_2$ and n have the meaning indicated in claim 1.
6. Reactive dyestuffs of the formula
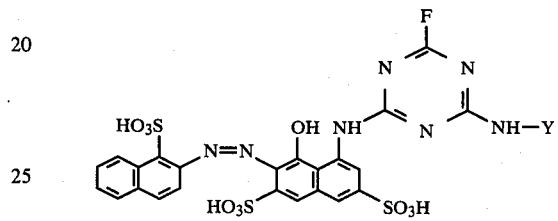
wherein Y is, 4-acetylaminophenyl.
* * * * *